(12) United States Patent
Yamasaki et al.

(10) Patent No.: US 6,357,753 B1
(45) Date of Patent: Mar. 19, 2002

(54) CARTRIDGE-TYPE MECHANICAL SEAL

(75) Inventors: Hiroshi Yamasaki; Shigeyuki Fujinaga, both of Hyogo-ken (JP)

(73) Assignee: Nippon Pillar Packing Co., Ltd., Osaka (JP)

(*) Notice: Subject to any disclaimer, the term of this patent is extended or adjusted under 35 U.S.C. 154(b) by 0 days.

(21) Appl. No.: 09/525,127

(22) Filed: Mar. 14, 2000

(30) Foreign Application Priority Data

Mar. 16, 1999 (JP) .............................................. 11-70984
Jun. 15, 1999 (JP) ........................................... 11-168067

(51) Int. Cl.⁷ .............................................. F16J 15/34
(52) U.S. Cl. ...................... 277/372; 277/370; 277/371; 277/373
(58) Field of Search ................................ 277/370, 371, 277/372, 373, 374, 379

(56) References Cited

U.S. PATENT DOCUMENTS

| 4,691,927 A | * | 9/1987 | Sudol et al. ................. 277/371 |
| 5,039,113 A | * | 8/1991 | Gardner ....................... 277/399 |
| 5,356,158 A | * | 10/1994 | Simmons et al. ............ 277/371 |
| 5,501,471 A | * | 3/1996 | Ohba et al. .................. 277/399 |
| 5,505,465 A | * | 4/1996 | Hornsby ....................... 277/371 |

* cited by examiner

Primary Examiner—Anthony Knight
Assistant Examiner—Enoch E Peavey
(74) Attorney, Agent, or Firm—Griffin & Szipl, P.C.

(57) ABSTRACT

A mechanical seal M1 that can be installed in a simple procedure and thus simplifies maintenance. The positioning of the stationary seal unit 3 and rotary seal unit 4 is effected by setting spacers 5 fixed on the stopper ring 36. The stopper ring 36 is mounted on the sleeve 34 by engaging connection means 37 which include annular grooves 48 formed in the stopper ring 36, pin engaging holes 49 provided in the sleeve 34, headed pins 51 comprising a pin portion 52 to engage with the pin engaging hole 49 and a head portion 53 which engages with the groove 48 and is relatively movable in the annular groove 48 of the stopper ring in the circumferential direction of the ring 36, but is relatively unmovable in the axial direction, and head lead-in inlets that open the annular groove 48.

10 Claims, 13 Drawing Sheets

CARTRIDGE-TYPE MECHANICAL SEAL

BACKGROUND OF THE INVENTION

1. Field of the Invention

The present invention relates to a cartridge-type mechanical seal. More specifically, this invention relates to the cartridge-type mechanical seal constituted in such a way that a stationary seal unit and a rotary unit seal unit are coupled and locked by a plurality of setting spacers when the seal is not installed. The stationary seal unit is to be fixed to the shaft seal casing of rotary equipment and the rotary seal unit that can be installed or removed in simple procedures is to be mounted on the rotary shaft extending through the shaft seal casing.

2. Description of the Prior Art

Generally, mechanical seals are made up of a stationary seal unit fixed to the shaft seal casing of rotary equipment and a rotary seal unit mounted on the rotary shaft that extends through the shaft seal casing. The mounting of the mechanical seal on the shaft seal casing and rotary shaft involves putting in place a number of such individual component parts as the seal rings one by one in a specific procedure.

Meanwhile, the positional relation between the component parts making up the seal units is an important factor determining the performance of the mechanical seal. The individual component parts have to be installed so that the positional relation is properly established. That is, those component parts have to be assembled with care taken to meet a number of requirements. The requirements include proper positioning of the two seal units in the axial and radial directions and securing parallelism and concentricity between the opposed seal end faces of the stationary seal ring and the rotary seal ring. It is understood that the parallelism is the perpendicularity to the axis of the shaft.

But, since those seal units are made up of a large number of component parts, the mounting of them on rotary equipment in a proper manner is quite difficult to even skilled mechanics, much more so to unskilled workers. The mechanical seal does not sometimes work properly because of faulty installation. The maintenance including removal from and re-installation on the rotary equipment is a troublesome and difficult job.

SUMMARY OF THE INVENTION

It is an object of the present invention to provide a cartridge-type mechanical seal wherein the seal units can be assembled with ease and accuracy into an integral structure (cartridge structure) in the same form as that of a mechanical seal put in service and wherein the mechanical seal in the assembled form can be directly installed on or removed from rotary equipment, thus making it possible and easy for a mechanic to perform maintenance involving installation and removal of the assembly from rotary equipment in a proper manner without difficulty.

It is another object of the present invention to provide a cartridge-type mechanical seal in which the stopper ring can be mounted on the stopper ring sleeve easily and securely such that common use of setting spacers, whose number is freely chosen, and simplification and mass production of the setting spacers, are permitted.

It is still another object of the present invention to provide a cartridge-type mechanical seal that can be reduced in size and weight. That is, the sleeve can now be made thin in wall thickness to the maximum extent, and therefore the stationary seal ring through which the sleeve is inserted can be reduced in diameter to the maximum extent. That in turn makes it possible to reduce the component parts of the seal units and the mechanical seal itself in size and weight.

It is a still further object of the present invention to provide a cartridge-type mechanical seal applicable, without changing the construction, to the shaft seal area of rotary equipment that is not designed for use of the mechanical seal (for instance stuffing boxes that are designed for a gland packing) because the mechanical seal can be mounted on and removed from the rotary unit in the assembled state identical to the form in service. Hence, the mechanical seal can easily deal with the changes in sealing conditions and required sealing performance, thus permitting its wide use and raising the practical value.

It is a further object of the present invention to provide a cartridge-type mechanical seal that is simple in construction and low in manufacturing costs and, in addition, is easy to assemble. That is, a means for thrusting the stationary seal ring and means for preventing that ring from rotating are simplified to the maximum extent. Further, the number of the component parts for those means is reduced. That simplifies the construction and reduces the manufacturing costs.

Those objects of the present invention are attained by providing cartridge-type mechanical seal so constructed that a stationary seal unit and a rotary unit seal unit are coupled, using a plurality of setting spacers in the same relative relations in position in the axial and radial directions as when the mechanical seal is in service. The stationary seal unit is to be fixed to the shaft seal casing of rotary equipment and the rotary seal unit that can be installed and removed in a simple procedure is to be mounted on the rotary shaft extending through the shaft seal casing. Those setting spacers are removable after the two seal units are installed on the shaft seal casing and the rotary shaft.

In a preferred embodiment, the stationary seal unit has a cylindrical mounting case to be installed on the shaft seal casing, a stationary seal ring held within the mounting case and a circular positioning surface formed on the mounting case concentrically with the stationary seal ring. The rotary seal unit has a sleeve, that is, a thin wall cylinder which can be mounted around and removed from the rotary shaft and which is placed concentrically in the stationary seal unit with one end of the sleeve protruding from the mounting case, a rotary seal ring installed, opposite to the stationary seal ring, at the other end of the sleeve, a stopper ring which is mounted on one end of the sleeve, and engaging connection means for engaging and connecting the stopper ring and the sleeve such that the two are relatively unmovable in the axial direction. In this embodiment, each setting spacer has a mounting portion attachable to and removable from the stopper ring and an engaging portion to engage with the aforesaid positioning surface. The engaging connection means comprises an annular groove formed in the inner circumferential portion of the stopper ring, a plurality of pin engaging holes formed in the sleeve, a plurality of headed pins which have each a pin portion to engage with the pin engaging hole and a head to engage with the annular groove of the stopper ring such that the head is relatively movable in the circumferential direction of the ring and relatively unmovable in the axial direction, and a plurality of head lead-in inlets which are formed on one end face of the stopper ring to open the aforesaid annular groove at a plurality of points in the circumferential direction and which permit the heads of the headed pins engaging with the pin engaging holes to be introduced into the aforesaid annular groove by relatively moving the headed pins in the axial direction of the ring.

In another preferred embodiment, the stationary seal unit has a cylindrical mounting case to be installed on the shaft seal casing, a stationary seal unit held inside the mounting case, and a circular positioning surface formed in the mounting case concentrically with the stationary seal unit. The rotary seal unit has a sleeve, that is, a thin wall cylinder which can be mounted around or removed from the rotary shaft without difficulty and which is placed concentrically in the stationary seal unit with part of the sleeve protruding from the mounting case, a rotary seal ring installed, opposed to the stationary seal ring, on the other end of the sleeve, a stopper ring which is inserted around one end of the sleeve, first set screws which are screwed into the stopper ring and can be tightened up on the outer circumferential surface of the sleeve, second set screws which are screwed into the stopper ring and can be tightened up on the circumferential surface of the rotary shaft portion through the sleeve. In that embodiment, each setting spacer has a mounting portion attachable to and removable from the stopper ring, an axial direction positioning portion thrust into and engaging with an engaging hole formed in the sleeve, and a radial direction positioning portion engaging with the positioning surface. On the other hand, the seal units include spring members to thrust and bring the two seal rings into contact with each other. The portion for positioning the setting spacer in the axial direction is pressed between the mounting case and the opposite face of the stopper ring by the thrusting force of the spring members, with the two seal rings properly pressed against and kept in contact with each other. The engaging holes of the sleeve are formed at positions where the axial direction positioning portions in such a pressed state engage with the holes.

In still another preferred embodiment, the mechanical seal comprises a stationary seal unit held in the mounting case movable in the axial direction, a rotary seal ring clamped, opposed to one end of the stationary seal ring, on the rotary shaft side and spring members to thrust the stationary seal ring against the rotary seal ring. In such an embodiment, an annular recession is formed on the outer circumferential portion at the other end of the stationary seal ring. A spring receptor made of an annular plate with part of it cut off is engaged with and clamped on that annular recession by its material elasticity. And the spring members are placed between the spring receptor and the opposite mounting case. There are formed engaging grooves at the other end of the stationary seal ring. With these engaging holes are engaged the drive pins fixed on the mounting case. The outer circumferential surface at the other end of the stationary seal ring is tapered, with the diameter gradually reduced from the annular recession.

Figure 1:
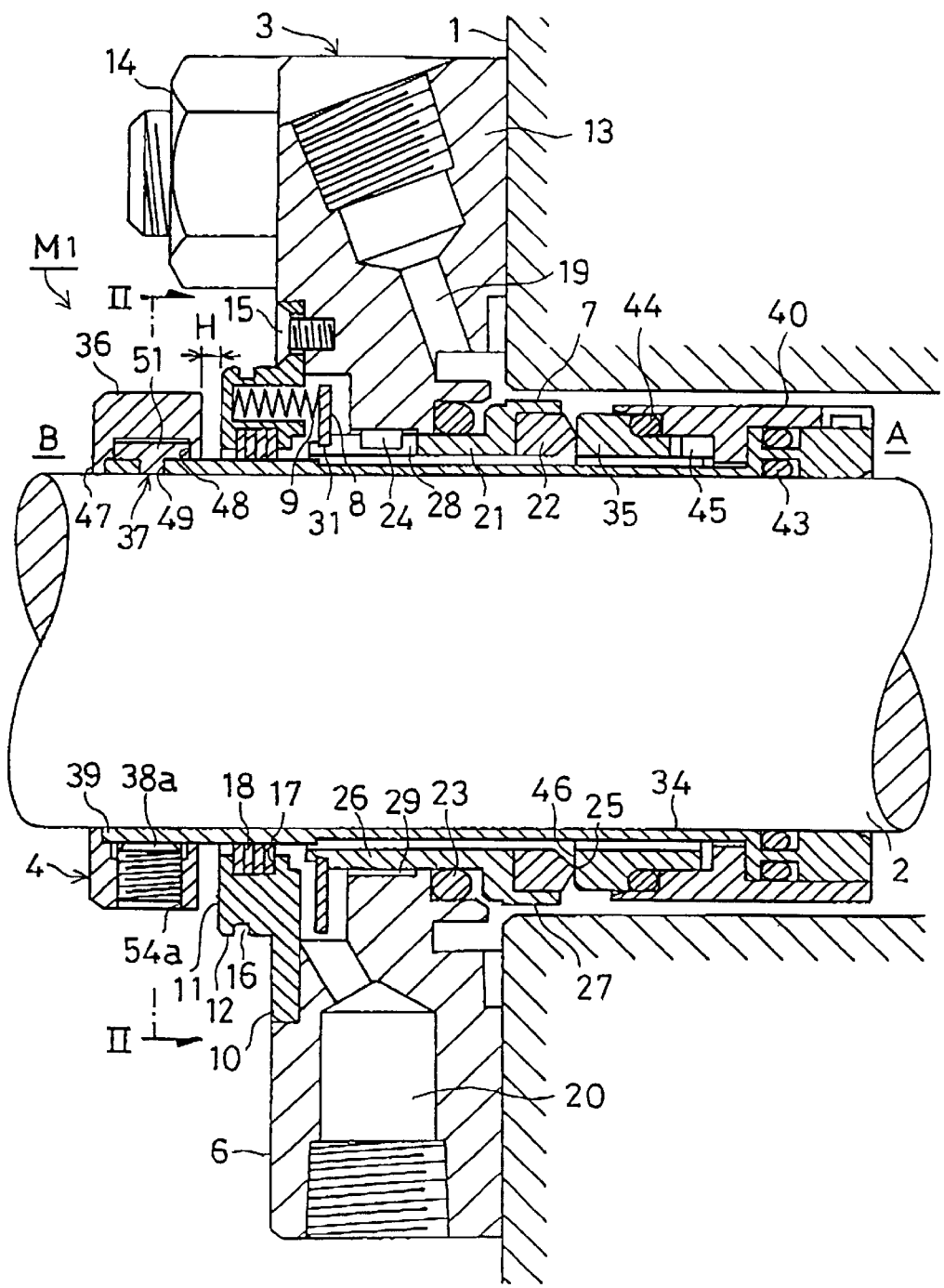
FIG. 1 is a side longitudinal sectional view (taken on line I□I in FIG. 2) of a first embodiment of the mechanical seal of the present invention showing the working arrangement for a sealing function.

DESCRIPTION OF THE PREFERRED EMBODIMENTS (Embodiment 1)

FIGS. 1 to 11 show the first embodiment of the present invention.

The mechanical seal M1 shown in FIGS. 1 to 11 is a cartridge-type mechanical seal which is installed between the shaft seal casing 1 of rotary equipment and the rotary shaft 2 that extends through and out of the casing 1 and which separates and seals the fluid region A the inside region of the rotary equipment from the atmospheric region B, i.e., the outside region.

The cartridge-type mechanical seal comprises a stationary seal unit 3, a rotary seal unit 4, a plurality of setting spacers 5 for coupling the two seal units 3, 4 when those two units are installed on or removed from the shaft seal casing 1 and rotary shaft 2. It should be understood that, as used herein, the words front, before, forward or the like denote left while such terms as rear, behind, back and backward indicate right in the drawings.

Figure 6:
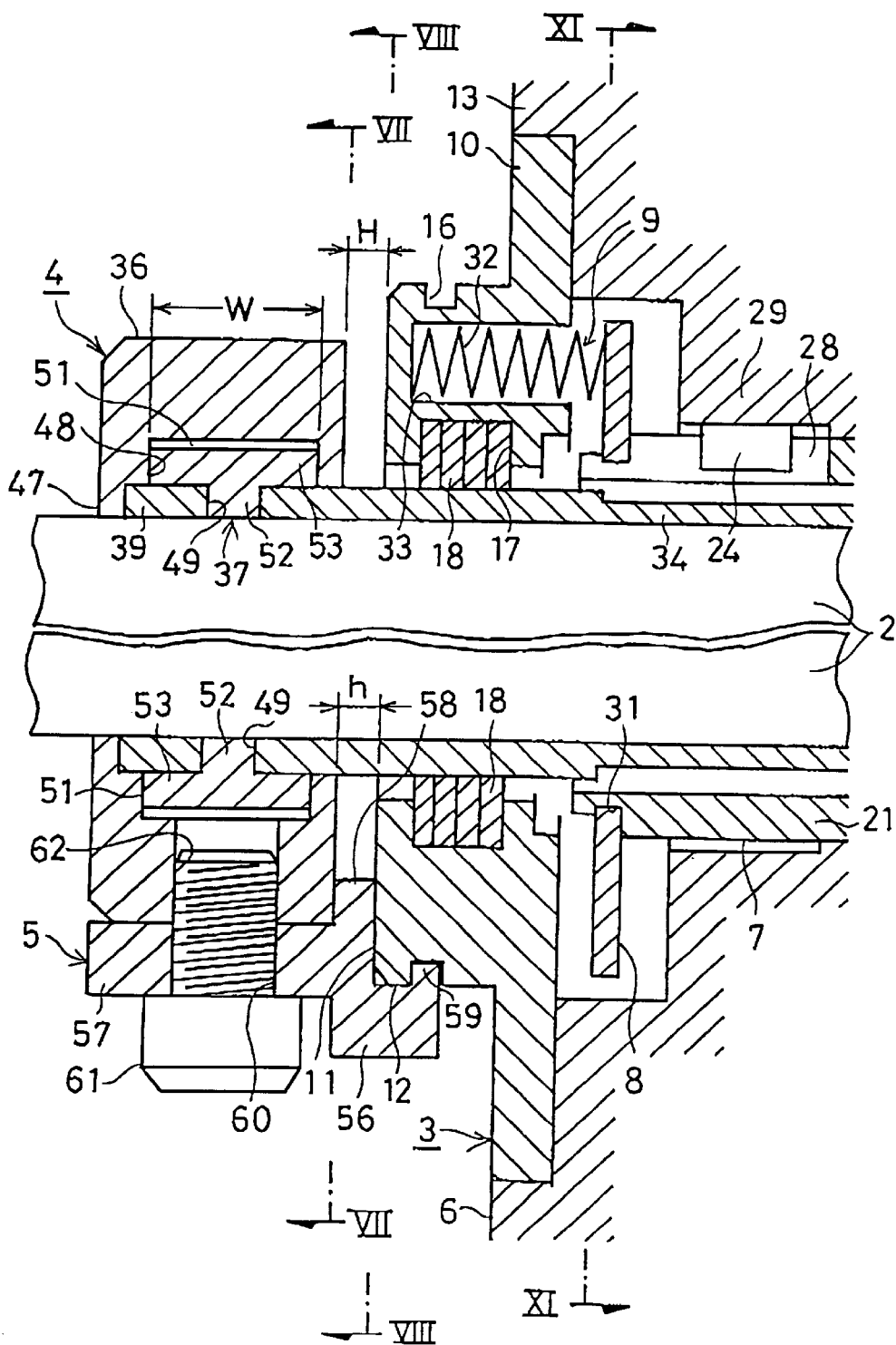
FIG. 6 is a side longitudinal sectional view of the core part of the mechanical seal being assembled.
Figure 7:
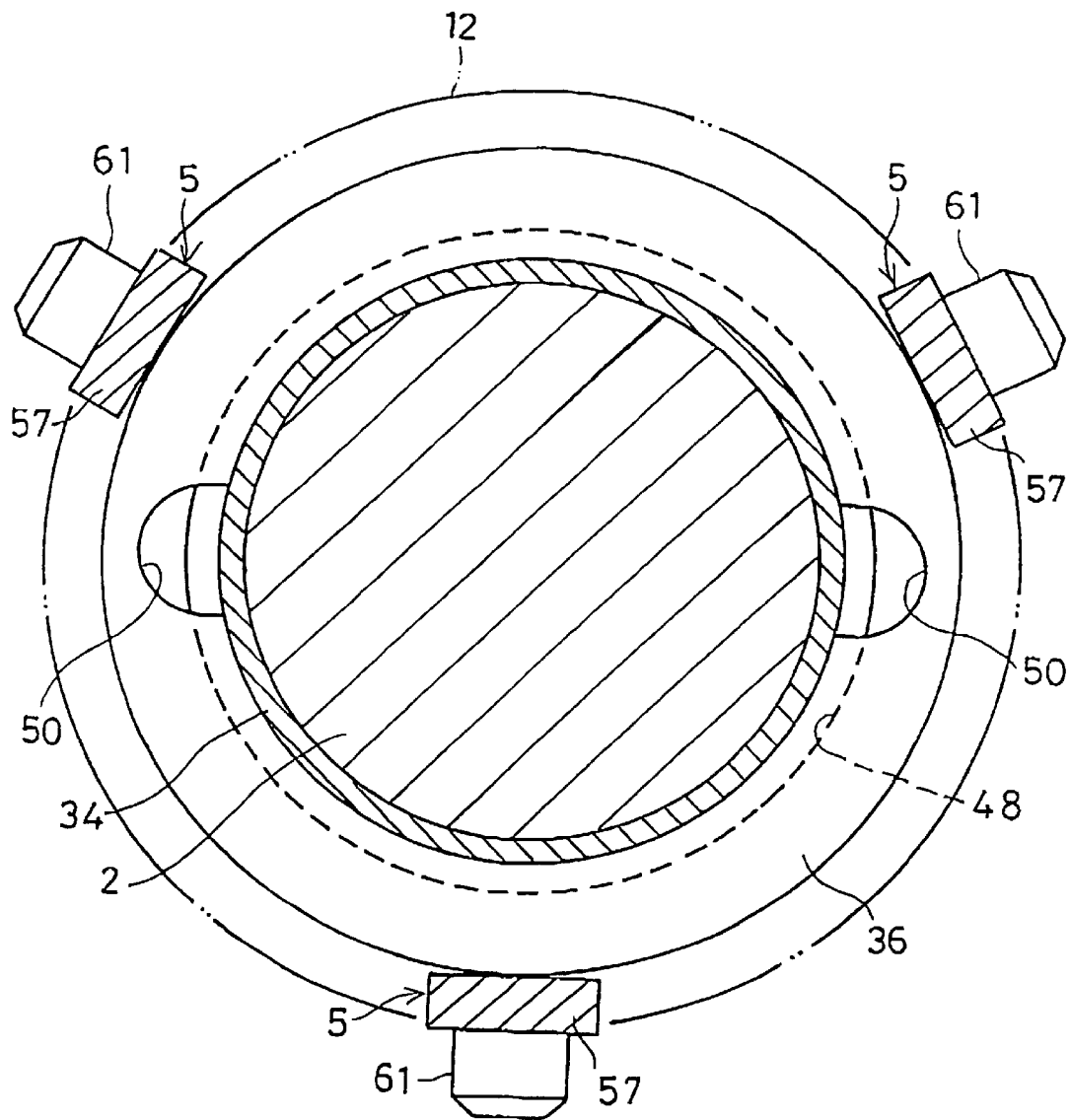
FIG. 7 is a rear longitudinal sectional view taken on line VII□VII in FIG. 6.
Figure 8:
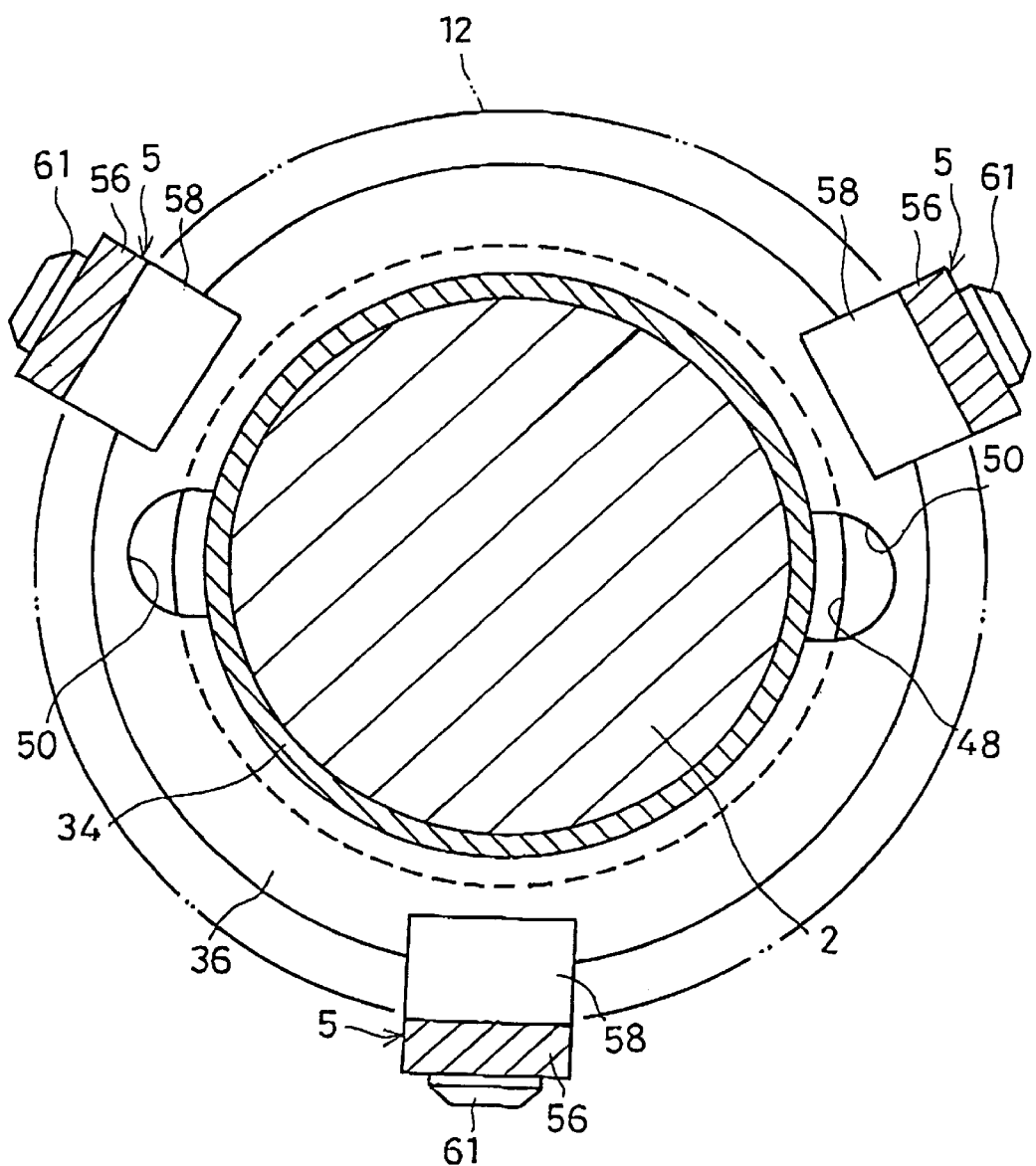
FIG. 8 is a rear longitudinal sectional view taken on line VIII□VIII in FIG. 6.
Figure 9:
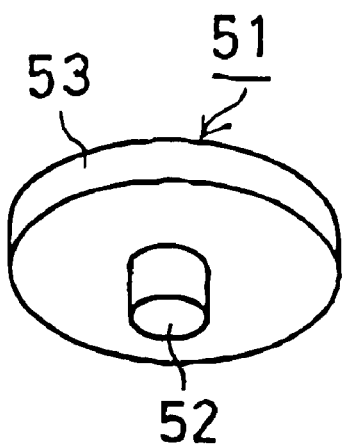
FIG. 9 is a perspective view of a headed pin.
Figure 10:
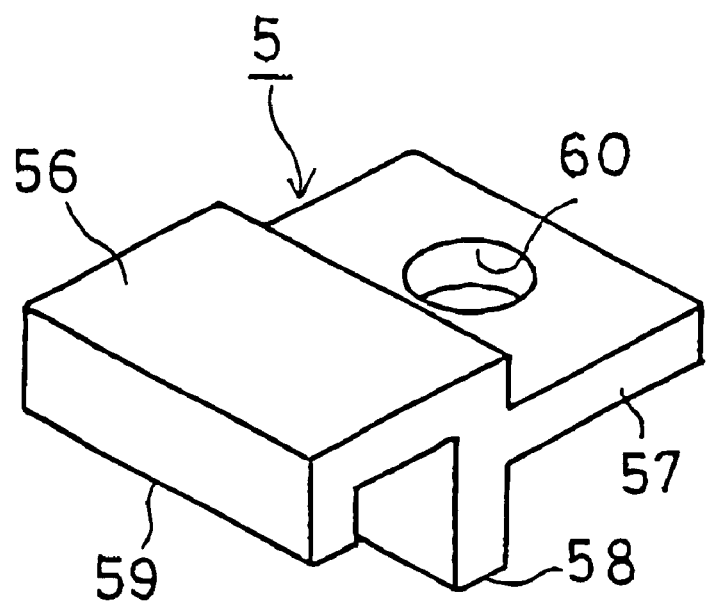
FIG. 10 is a perspective view of a setting spacer.

The stationary seal unit 3 comprises, as shown in FIGS. 1 and 6, a cylindrical mounting case 6 to be installed on the shaft seal casing 1, a stationary seal ring 7 mounted inside the mounting case 6, a spring receptor 8 provided on stationary seal ring 7, spring members 9 placed between the mounting case 6 and the stationary seal ring 7 and a circular positioning surface 12 formed at the front end portion 11 of the mounting case 6 (at the front end portion of a spring holder 10 which will be described in the following) concentrically with the stationary seal ring 7.

The mounting case 6 comprises a cylindrical case block 13 and the annular spring holder 10 fit and held around the inner circumferential surface of the front end of the cylindrical case block 13 as shown in FIGS. 1 and 6. The cylindrical case block 13 is fixed to the front end of the shaft seal casing 1 with bolts and nuts (only one set of bolt and nut shown), with the rotary shaft 2 concentrically extending through the cylindrical case block 13. The spring holder 10 is fixed to the front end of the cylindrical case block 13 with a number of machine screws 15 (only one screw shown) in such a way that the front end portion 11 of the spring holder 10 protrudes forward from the front end of the cylindrical case block 13 and the rotary shaft 2 concentrically passes through the front end portion 11. The front end face of the spring holder 10 is formed in the shape of annular plane perpendicular to the axis of the cylindrical case block 13. Formed on the outer circumferential surface of the front end portion of the mounting case 6, that is, on the outer circumferential surface of the front end portion 11 of spring holder 10 is the circular positioning surface 12 concentric with the cylindrical case block 13 and stationary seal ring 7 which will be described later. Behind that is formed an annular engaging groove 16. Furthermore, an annular recession 17 is formed in the inner circumferential portion of the spring holder 10 as shown FIG. 6. In this recession 17, there are placed annular seal members 18 which are designed to work as secondary seal between the seal spring holder 10 and rotary shaft 2. The annular seal members 18 used in this example are a plurality of spiral rings of a plastic material like PTFE (strips in a spiral form). Those spiral rings are placed in the annular recession 17 in the state layered in the axial direction. The cylindrical case block 13 is provided with a flushing passage 19 and a quenching passage 20 as shown in FIG. 1.

The stationary seal ring 7 comprises a cylindrical holder 21 and an annular seal ring element 22 as shown in FIG. 1 and is held within the inner circumferential portion of the cylindrical case block 13 by means of an O ring 23 and a drive pin 24 and placed movable in the axial direction (in the front and rear direction) and relatively unrotatable. The sliding seal end face (rear end face) 25 of the annular seal element 22 is sharpened. Generally, the cylindrical holder 21 is made of metal, while the annular seal ring element 22 is formed of ceramic, hard metal, carbon or the like. In the present example, the holder 21 is made of titanium and the annular seal ring element 22 is formed of silicon carbide.

The cylindrical holder 21 comprises a small diameter first cylindrical portion 26 and a large diameter second cylindrical portion port 27 which is integrally formed at the rear end of the former as shown in FIG. 1 and FIG. 6. The small diameter first cylindrical portion 26 has a groove 28 that opens at the forward portion and extends in the axial direction. The annular seal ring element 22 is concentrically fit and held in the large diameter first cylindrical portion port 27.

The stationary seal ring 7 is held relatively unrotatable in the cylindrical case block 13 and is allowed to move in the axial direction within the limit of the groove 28 with the drive pin 24 engaged with the groove 28 formed in the first cylindrical portion 26 of the cylindrical holder 21 as shown in FIG. 1 and FIG. 6. The drive pin 24 is embedded in the inner circumferential portion of the cylindrical case block 13, that is, a small diameter annular shoulder 29 formed in that portion. The inside diameter of the small diameter annular shoulder 29 is so chosen as to allow the first cylindrical portion 26 of the cylindrical holder 21 to pass this annular shoulder 29 with some leeway. In the present example, the drive pins 24 and notched grooves 28 are provided at two positions opposed to each other in the direction of diameter as shown in FIG. 11.

The stationary seal ring 7 is held in the cylindrical case block 13 and concentrically held movable in the axial direction with an O ring 23 provided backwardly of the annular shoulder 29 and between the first cylindrical portion 26 of the cylindrical holder 21 and the cylindrical case block 13 as shown in FIG. 1. This stationary seal ring 7 is concentric with the circular positioning surface 12 formed in is the cylindrical case block 13.

The spring receptor 8 is formed of an annular plate made of metal (stainless steel under the JIS designation SUS 304 etc.) which is cut off at one point 30. And this spring receptor 8 is engaged and fixed in an annular recession 31 formed forwardly of the annular shoulder 29 and on the outer circumferential portion at the front end of the first cylindrical portion 26 of the cylindrical holder 21 as shown in FIGS. 1, 6 and 11. The spring receptor 8, which is cut off at one point 30, can be placed in or removed from the annular recession 31 by making use of the material elasticity. The material and the plate thickness are properly chosen so as to be able to obtain sufficient material elasticity for installation and removal of the receptor 8 and to secure strength enough to withstand the spring pressure. It is noted that the spring receptor 8 is kept from moving back beyond a specific extent, that is, beyond where the receptor comes in contact with the front end of the annular shoulder 29. It is also so arranged that the stationary seal ring 7 will not move back out of the mounting case 6 when urged by spring members 9 which will be described in the following.

Figure 11:
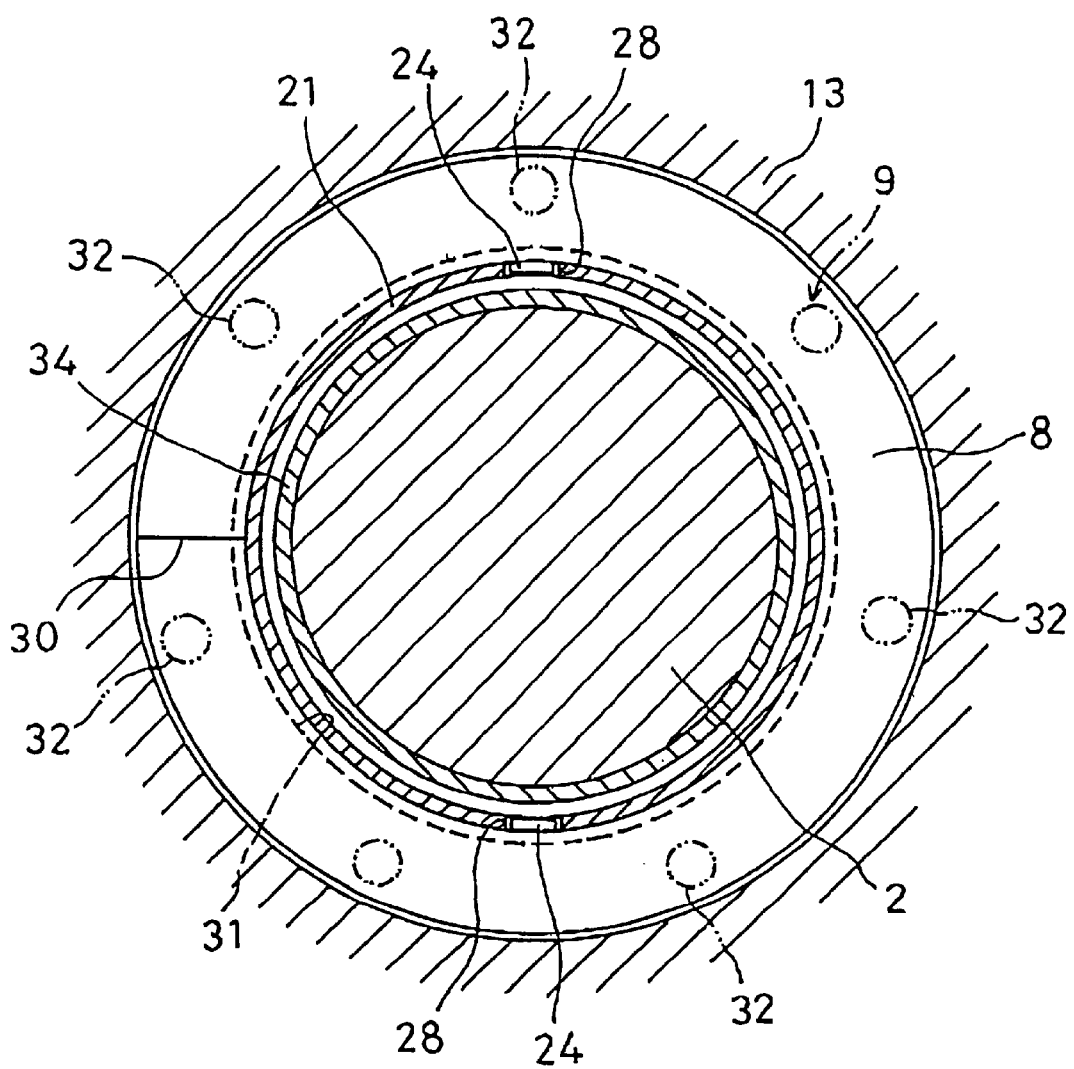
FIG. 11 is a front longitudinal sectional view taken on line XI□XI in FIG. 6.

The spring members 9, which include a plurality of coil springs 32 placed between the spring holder 10 and spring receptor 8, urge backward the stationary seal ring 7 as shown in FIG. 6 and FIG. 11. The coil springs 32 are provided at equal intervals in the circumferential direction. The front end portion of each coil spring 32 is engaged and held in a recession 33 formed at the rear portion of the spring holder 10.

Figure 2:
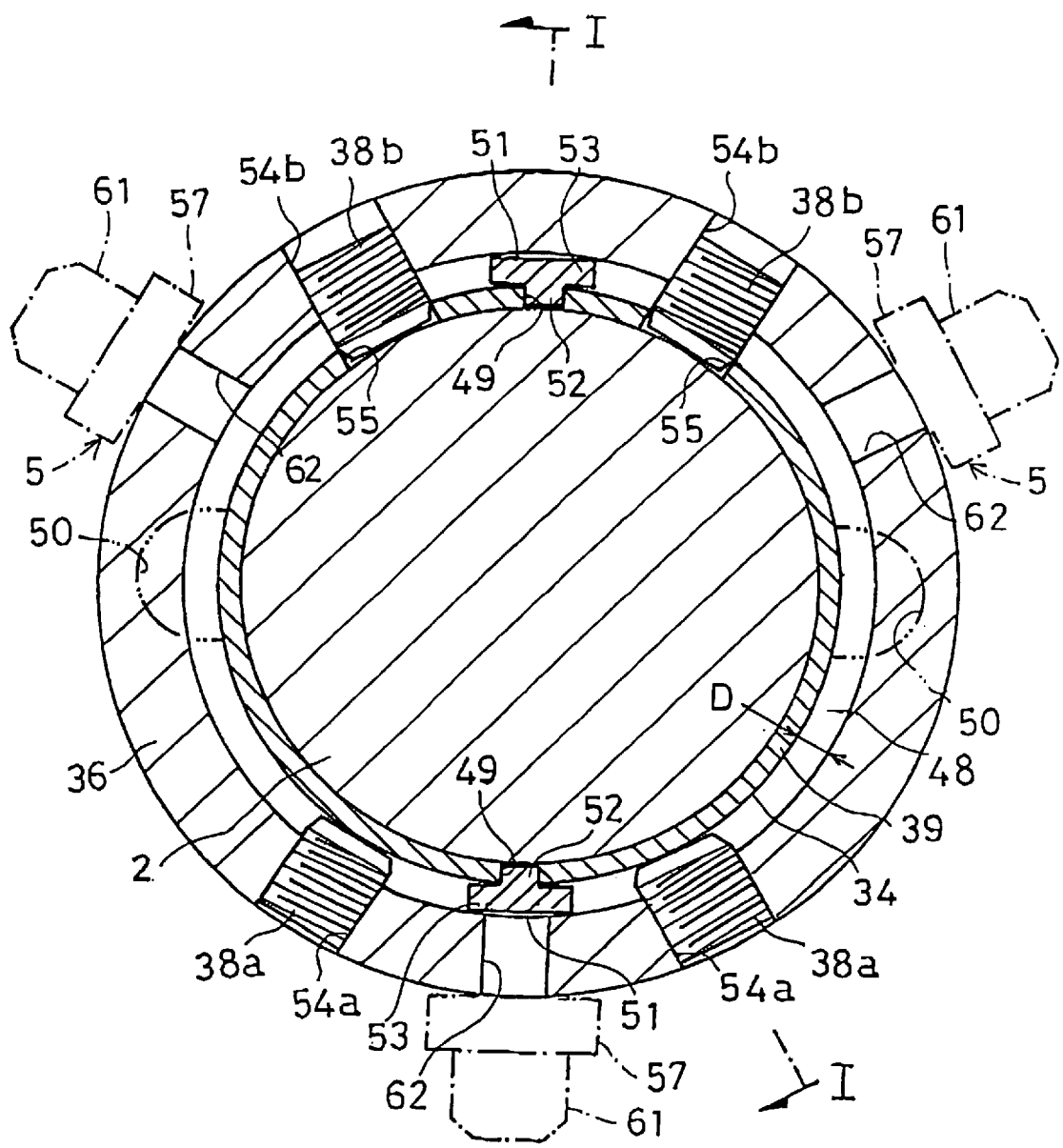
FIG. 2 is a front longitudinal sectional view taken on line II□II in FIG. 1.

The rotary seal unit 4 comprises a sleeve 34 placed around the rotary shaft 2, a rotary seal ring 35 fixed on the sleeve 34, a stopper ring 36 to fix the sleeve 34 on the rotary shaft 2, engaging connection means 37 for engaging and connecting the stopper ring 36 for forbidding their relative movement in the axial direction, and a proper number (in this example, two pieces) of first set screws 38a which are screwed into the stopper ring 36 and can be tightened against the outer circumferential surface of the sleeve 34 and an appropriate number (in this example, two pieces) of second set screws 38b that extend through the sleeve 34 and can be tightened against the outer circumferential surface of the rotary shaft 2 as shown in FIG. 1 and FIG. 2.

The sleeve 34 is mounted around the rotary shaft 2 with its front end portion 39 and rear end portion 40 protruding out of the mounting case 6 as shown in FIG. 1. The sleeve 34 is thin in wall thickness and cylindrical in shape except for the rear end portion 40. In the rear end portion 40, an O ring 43 is placed as secondary seal between the inner circumferential portion of the sleeve 34 and the rotary shaft 2 as shown in FIG. 1. At the front end 39, there are provided a proper number of setting holes 55 (in this example, two holes).

The rotary seal ring 35 is concentrically fit and held in the rear end portion 40 of the sleeve 34 by an O ring 44 and a drive pin 45 as shown in FIG. 1. And the stationary seal ring 7, that is, the annular seal ring element 22, is pressed against the rotary seal ring 35 by the coil springs 32. The rotary seal ring 35 is formed of ceramic, hard metal or the like. In the present example, the rotary seal ring 35 is made of silicon carbide. It is noted that the mechanical seal M1 is of the end face contact type. For it is so arranged that the relatively sliding contact between the opposed seal end faces 25, 46 of the stationary seal ring 7 and rotary seal ring 35 seals and separates the fluid region A or the region at the outer circumferential side of the relatively sliding contact area from the atmospheric region B or the inner circumferential side region. A special feature is that the seal end face 25 of the stationary seal ring 7 is sharpened as mentioned earlier and comes into linear contact with the seal end face 46 of the rotary seal ring 35. That is, the mechanical seal M1 is a so-called knife edge seal.

The stopper ring 36 is an annular component part concentrically fit at the front end portion 39 of the sleeve 34 as shown in FIGS. 1 to 6. The stopper ring 36 is engaged and connected with the sleeve 34 in such a way that an annular shoulder 47 formed in the front end inner circumferential portion of the stopper ring 36 is fit to the front end of the sleeve 34—the state permitting the stopper ring 36 to properly fit to the sleeve 34 (hereinafter referred to as the proper fitting state).

The engaging connection means 37 has an annular groove 48 formed in the inner circumferential portion of the stopper ring 36, a plurality of pin engaging holes 49 provided in the front end portion 39 of the sleeve 34, a plurality of head lead-in inlets 50 formed in the rear end face portion or one end face portion of the stopper ring 36 and a plurality of headed pins 51 which fix the stopper ring 36 to the sleeve 34 so that the sleeve 34 is relatively unmovable in the axial direction as shown in FIGS. 1 to 9. The number of pin engaging holes 49 and head lead-in inlets 50 depend on the number of headed pins 51 to be used. In the present example, two headed pins 51 are used.

In the front end portion 39 of the sleeve 34, there are provided annular pin engaging holes 49 at two points at equal intervals in the circumferential direction as shown in FIG. 1 to FIG. 6. Also, in the rear end face portion of the stopper ring 36 are formed head lead-in inlets 50 at two points at equal intervals in the circumferential direction as shown in FIG. 2 to FIG. 5, FIG. 7 and FIG. 8. The head lead-in inlets 50 are large enough to lead the head portion 53 of the headed pin 51 in the annular groove 48 as described in the following.

Figure 3:
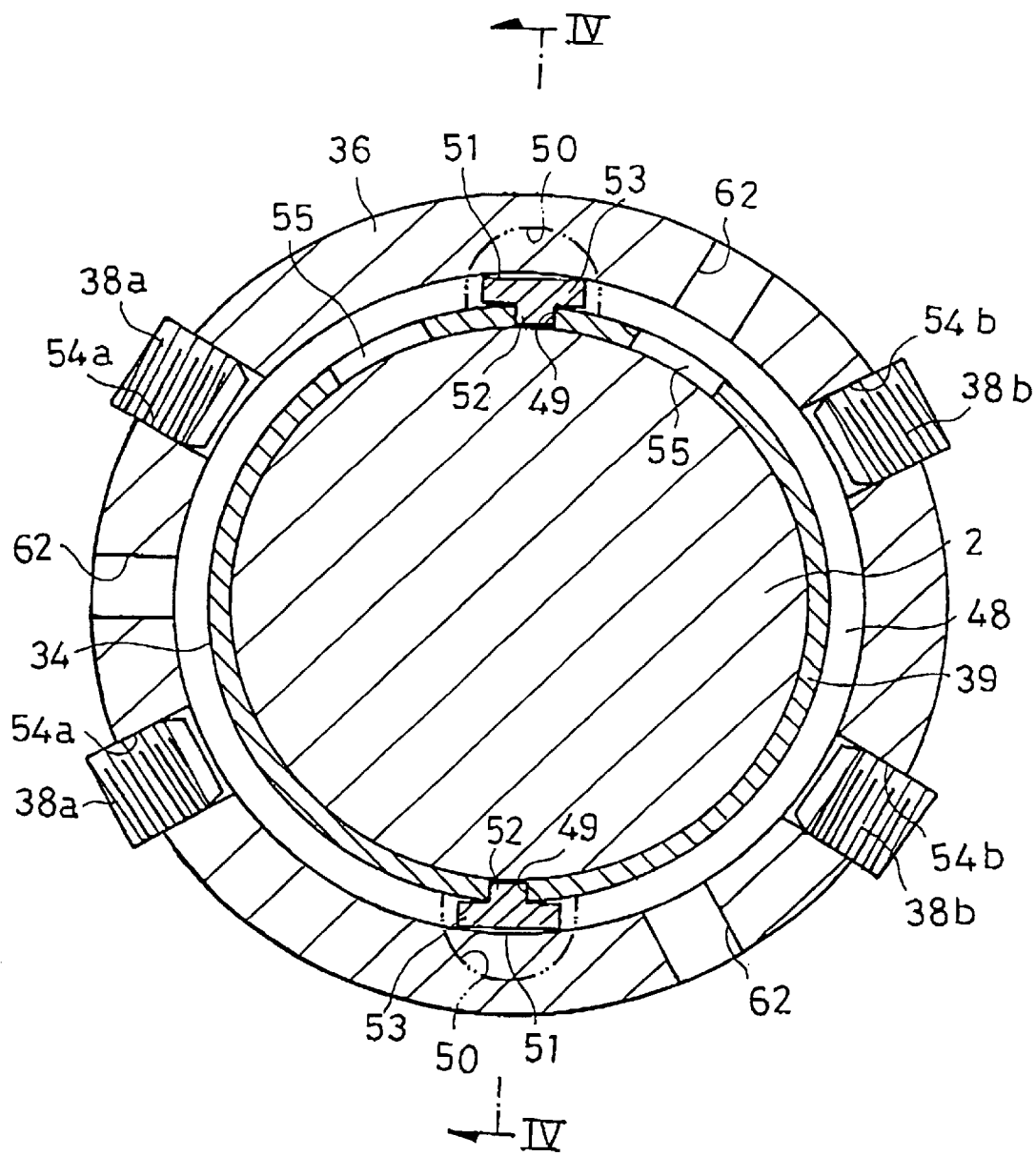
FIG. 3 is a front longitudinal sectional view corresponding to FIG. 2 showing the headed pins led into the annular groove of the stopper ring.
Figure 4:
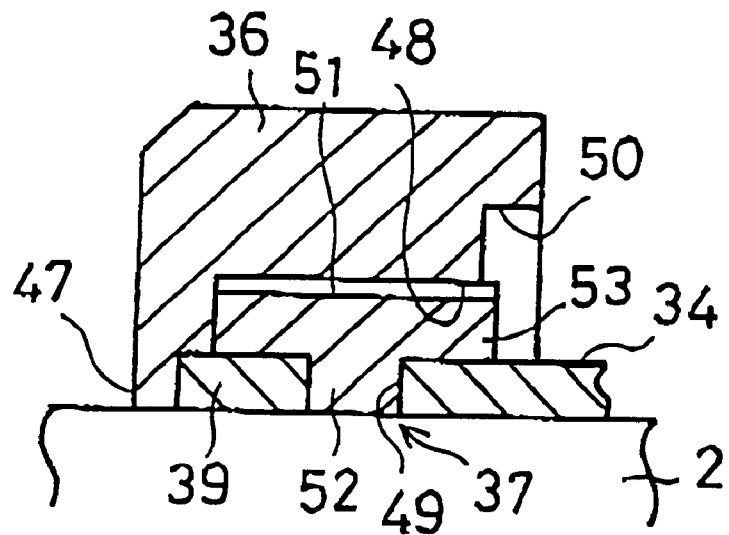
FIG. 4 is a sectional view of a core part taken on line IV□IV in FIG. 3.
Figure 5:
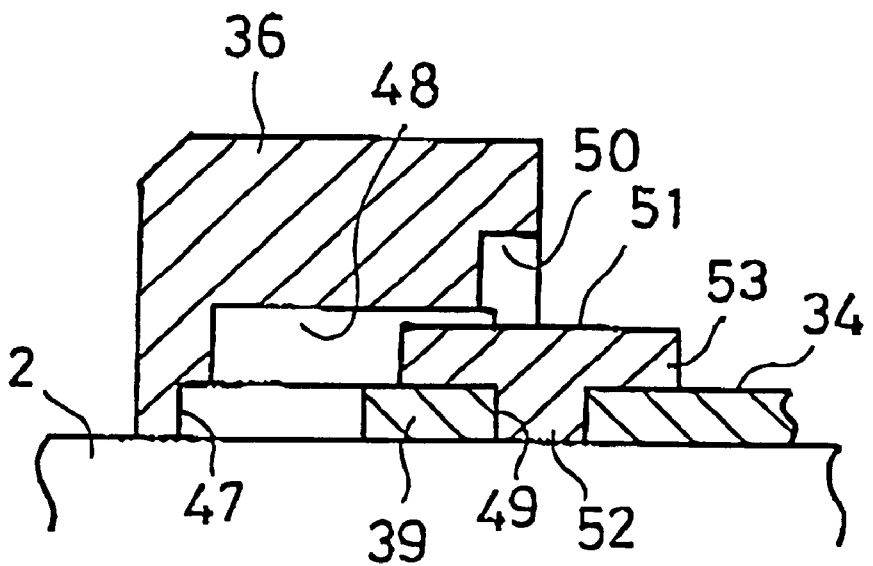
FIG. 5 sectional view corresponding to FIG. 3 but showing a different state from FIG. 3.

The headed pin 51 is integrally formed of a metallic material (in this example, the stainless steel SUS 304) and has a T-shaped cross section, comprising a cylindrical pin portion 52 which can be freely engaged in or removed from the pin engaging hole 49 and a head portion 53 attached to one end of the pin portion 52 as shown in FIG. 1 to FIG. 6 and FIG. 9. The length of the cylindrical pin portion 52 (in the axial direction) is roughly equal to the thickness of the sleeve portion where the 49 is formed. The length is chosen so that the head portion 53 can be engaged in the pin engaging hole 49 without protruding beyond the inner circumferential surface while the head portion 53 is brought into contact with the outer circumferential surface of the sleeve 34. The head portion 53 is in the form of a disk with the cylindrical pin portion 52 attached in the center. The diameter of the head portion 53 is set roughly to the width W of the annular groove 48 and the thickness is set roughly to the depth D of the annular groove 48. That keeps the stopper ring 36 from moving in the axial direction while allowing it to relatively move in the circumferential direction when the stopper ring 36 is in the proper fitting state. Therefore, the respective headed pins 51 are relatively led into the annular grooves 48 (FIG. 5) when the stopper ring 36 is placed on the sleeve 34 and moved backward with the respective head lead-in inlets 50 placed opposite to the respective head portions 53 (shown in FIG. 3, to be called "fitting and removable position" hereinafter) after the headed pins 51 are engaged in the pin engaging holes 49. Furthermore, the stopper ring 36 is moved backward in relation to the sleeve 34 to take the proper fitting state until the respective head portion 53 are completely led into the annular groove 48 (FIG. 3, FIG. 4). Then, the stopper ring 36 is turned by a specific degree (90 degrees from the fitting and removable position, for example) to move the respective head portions 53 relatively in the circumferential direction to a position differing from the head lead-in inlets 50 (to be referred to as "the fixing position" hereinafter). That way, the stopper ring 36 can be engaged and held immovable in relation to the sleeve in the axial direction in the proper fitting state. The head portion 53 may be in any shape as long as it can move relatively in the annular groove 48. The shape of the head portion 53 is not limited to the disk shape as described; the head may be an elliptic plate or an oval plate with a short axis roughly equal to the groove width W or a sphere with a diameter roughly equal to the groove width W. Also, the cross section of the cylindrical pin portion 52 and the shape of the pin engaging hole 49 are not restrictive as long as the strength of the thin wall sleeve 34 does not drop more than necessary. They may be elliptic, square or the like, for example.

The stopper ring 36 is provided with an appropriate number of first screw holes 54a (in this example, two holes) and an appropriate number of second screw holes 54b (in this example, two holes) at appropriate intervals in the circumferential direction. Those screw holes 54a, 54b are through holes directed in the radial direction. Those screw holes 54a, 54b are so positioned that the second screw holes 54b overlap with the setting holes 55, but the holes 54a do not. The first set screws 38a are screwed into the first screw holes 54a, and when the first set screws 38a are tightened against the outer circumferential surface of the sleeve 34 as shown in FIG. 2, the stopper ring 36 is clamped on the sleeve 34. The second set screws 38b are screwed into the second screw holes second 54b. When the second set screws 38b are screwed through the setting holes 55 and tightened against the outer circumferential surface portion as shown in FIG. 2, the stopper ring 36 will be fixed on the rotary shaft 2. That is, the sleeve 34 can be clamped on the rotary shaft 2 by tightening the first set screws 38a and second set screws 38b provided in the stopper ring 36 as shown in FIG. 1 and FIG. 2. And the sleeve 34 can be mounted on or removed from the sleeve 34 by loosening the set screws 38a and second set screws 38b as shown in FIG. 3. It is noted that the two setting holes 55 are in the same place in the radial direction as the pin engaging holes 49. The two setting holes 55 are also located near the both sides of the pin engaging hole 49 in me circumferential direction as shown in FIG. 2 and FIG. 3. Also, the screw holes 54a and 54b are provided at points intermediate between the pin engaging hole 49 and the head lead-in inlet 50 when the stopper ring 36 is in the clamping position or the proper fitting state as shown in FIG. 2. The head portions 53 move in the annular groove 48 as the stopper ring 36 is turned from the clamping position to the fitting and removing position. That can be achieved without difficulty by having the set screws 38a and 38b not protrude out into the annular groove 48 as shown in FIG. 3.

Therefore, the sleeve 34 can be clamped on the rotary shaft 2 by tightening is the set screws 38a and second set screws 38b against outer circumferential surface of the sleeve 34 and the outer circumferential surface of the rotary shaft 2 while the stopper ring 36 remains connected with the sleeve 34 by the headed pins 51 as shown in FIG. 1 and FIG. 2. And the sleeve 34 can be installed on or removed from the rotary shaft 2 by loosening the set screws 38a and second set screws 38b as shown in FIG. 3. It is noted that the screw holes 54 are so provided that they come at points intermediate between the pin engaging hole 49 and the head lead-in inlet 50 when the stopper ring 36 is placed in the fixing position or in the proper fitting position as shown in FIG. 2. Furthermore, the screw holes 54 extend through to the annular groove 48. Therefore, when the set screws 38a and 38b are loosened with the end portions left protruding out into the annular groove 48, there is no possibility that the end portions will relatively move to a position where the head portion 53 of the headed pin 51 comes to the head lead-in inlet 50. In other words, the possibility is precluded that way that the stopper ring 36 will inadvertently turn and get loose from the sleeve 34. When the sleeve 34 is installed on or removed from the rotary shaft 2, there is no fear that the link between the sleeve 34 and the stopper ring 36 by the headed pins 51 will get loose. By the way, the whole length of the sleeve 34 is so set that the rear end face of the stopper ring 36 mounted on the sleeve 34 is a specific interval H (proper interval) away from the front end face of the spring holder in the axial direction when the two seal units 3, 4 are in a proper positional relation in the axial direction, that is, when the two seal rings 7, 5 are brought in contact with each other by the spring members 9 with a proper contact pressure.

The setting spacer 5 is integrally formed of a metallic or plastic material(in this example, the stainless steel SUS 304). As shown in FIGS. 6 to 8 and FIG. 10, the setting spacer 5 comprises a radial direction positioning portion 56 in the shape of a rectangular plate, a mounting portion 57 in the shape of a rectangular plate connected with one end portion of the radial direction positioning portion 56 in parallel, an axial direction positioning portion 58 in the shape of a rectangular plate connected perpendicularly with one end portion of the radial direction positioning portion 56, and an engaging portion 59 in the shape of a rectangular plate connected with the other end portion of the radial direction positioning portion 56 and protruding in parallel with the axial direction positioning portion 58. Those portions 56, 57, 58 and 59 are identical in width. The mounting portion 57 is provided with a through hole 60 in the center in the direction of width. In this example, three setting spacers 5 are used. Those setting spacers 5 are to be installed on the outer circumferential portion of the stopper ring 36 at equal intervals by screwing proper fixing parts 61 (in this example, hexagon socket head cap bolts)into the through holes 60 at the respective rectangular mounting portions 57. The positional relation in the direction of plate thickness— i.e. the direction parallel with the protruding direction of the axial direction positioning portion 58 and the engaging portion 59, between the radial direction positioning portion 56 and mounting portion 57 is set to meet the condition that the radial direction positioning portion 56 should come into contact with the circular positioning surface 12 when the mounting portion 57 is fixed on the stopper ring 36 with the two seal units 3, 4 in an concentric state. The plate thickness h of the axial direction positioning portion 58 and the distances between the axial direction positioning portion 58 and the engaging portion 59 and the through hole 60 are determined to meet the requirement that the axial direction positioning portion 58 should be pressed between the rear end face of the stopper ring 36 and the front end face of the spring holder 10 with the engaging portion 59 engaged in the annular engaging groove 16 when the positioning portion 57 is fixed on the stopper ring 36 with the two seal units 3,4 in a proper positional relation in the axial direction. Meanwhile, the sleeve 34 is pressed backward in relation to the mounting case 6 by the coil springs 32 that thrust the two seal rings 7, 35 against each other. And the space in the radial direction between the stopper ring 36 and the spring holder 10 is maintained at a proper interval H because the axial direction positioning portion 58 is placed in the space. That way, the two seal units 3, 4 are prevented from relatively moving in the axial direction by having the axial direction positioning portion 58 pressed between the stopper ring 36 and spring holder 10 by the thrusting force. Needless to say, the relative movement is also blocked by the engagement of the engaging portion 59 with the annular engaging groove 16.

The mechanical seal M1 thus constructed is assembled into a cartridge structure identical to the structure in operation that achieves the required seal functions. The assembling procedure is now described.

First, the stationary seal ring 7 with the O ring 23 fitted thereon is inserted into the cylindrical case block 13 from the backward direction. The drive pins 24 are placed in the notched grooves 28 of the stationary seal ring 7. Then the spring receptor 8 is put and fixed in the annular recession 31 of the stationary seal ring 7. The spring receptor 8 can be placed in the annular recession 31 without difficulty because of a cutoff 30 in the annular plate that permits the spring receptor 8 to elastically deform.

In the next step, the sleeve 34 with rotary seal ring 35 fixed on it is inserted into the stationary seal ring 7 from behind so that the stationary seal ring 7 is placed opposite to the rotary seal ring 35. Then, the spring holder 10 with the coil springs 32 put in place is placed over the front end portion 39 of the sleeve 34 protruding forward from the cylindrical case block 13. And the respective cylindrical pin portions 52 of the headed pins 51 are put in the pin engaging holes 49. Then, the spring holder 10 is fixed on the cylindrical case block 13 by means of the machine screws 15 to assemble the mounting case 6. And the stopper ring 36 is placed over the front end portion 39 of the sleeve 34 to lead the head portions 53 of the headed pins 51 through the head lead-in inlet 50 into the pin engaging hole 49. That puts the stopper ring 36 in the fitting and removable position (FIG. 3, FIG. 4).

Then, the stopper ring 36 is turned by 90 degrees from the fitting and removable position to the fixing position. That fixes the stopper ring 36 on the front end portion 39 of the sleeve 34 by means of the headed pins 51, thereby forbidding the relative movement of the stopper ring 36 in the axial direction (see FIG. 2). Then, the mounting portions 57 of the setting spacers 5 are put on the stopper ring 36. That is done with the radial direction positioning portion 56 engaging with the positioning surface 12 of spring holder 10 and with the engaging portion 59 engaging with the annular engaging groove 16 and the axial direction positioning portion 58 pressed between the stopper ring 36 and the spring holder 10. That produces a cartridge-type mechanical seal M1 with the two seal units 3, 4 positioned ready for service in the axial direction and radial direction (see FIG. 6).

The radial direction positioning portion 56 of the setting spacer 5 is in the shape of a plate and comes merely in linear contact with the circular positioning surface 12. But since three contact points are provided at equal intervals in the circumferential direction, the two seal units 3, 4 can be held concentrically in the proper positional relation in the radial direction (see FIG. 8). It is also noted that the setting spacers 5 for the present embodiment can be used without modifications in other embodiments which are different in the size of the two seal units 3, 4 as long as the radius difference between the outer circumferential surface of the stopper ring 36 and the circular positioning surface 12 is the same as that of the present embodiment. That is because the radial direction positioning portion 56 and the mounting portion 57 of the setting spacer 5 are in the shape of a plate. In other words, the setting spacers 5 are suited for common use. The same is also applicable to the headed pins 51.

Meanwhile, when the mechanical seal M1 is removed and mounted, it is necessary to have the sleeve 34 fixed on the stopper ring 36 so that the two seal units 3, 4 remain coupled. The fixing of the stopper ring 36 on the sleeve 34 could be effected by means of the engaging connection means 37 including the headed pins 51 and also by strongly tightening the set screws 38a against the outer circumferential surface of the sleeve 34. That also could be achieved if the axial direction positioning portion 58 of the setting spacer 5 is to be extended into a slit which is to be formed on the sleeve 34. In the second case, if the set screws 38a are tightened too strongly, it can deform the thin wall sleeve 34. One way to avoid such a problem might be to have a thicker wall thickness sleeve 34. But that makes it necessary to increase more than necessary the diameter of the stationary seal ring 7 through which the sleeve 34 is inserted and the rotary seal ring 35 which is fit and fixed on the sleeve 34. That in turn inevitably leads to enlargement of the cylindrical case block 13 and other component parts, that is, the size of the mechanical seal M1 itself. In addition, since the sleeve 34 is a long component part, an increased wall thickness would enlarge the stationary seal ring 7, spring receptor 8 and other parts and increase the weight of the mechanical seal M1. In the last case, it is not practicable to have three slits with which the extensions of the axial direction positioning portion 58 would engage in the light of the strength of the sleeve 34 in those slit areas. For such a consideration, the positioning in the radial direction of the seal units 3, 4 might be effected by using the setting spacers 5 at two points. But it would be difficult to achieve the positioning by two setting spacers 5 reliably and accurately. Further, if the positioning is effected using two setting spacers 5, the radial direction positioning portion 56 will have to be in the form of a circular arc conforming to the circular positioning surface 12. But the setting spacer 5 made in that shape is no longer applicable to common use.

On the other hand, the engaging connection means 37 will not deform the sleeve 34 because the sleeve 34 and the stopper ring 36 are merely engaged and connected with each other by means of the headed pins 51 such that the two are relatively unmovable in the axial direction. Furthermore, only small pin engaging holes 49 are made in the sleeve 34 to engage the cylindrical pin portions 52, and the provision of those small holes 49 can hardly reduce the strength of the sleeve 34. In addition, the number of setting spacers 5 is not limited unlike the last case. That is, three or more setting spacers 5 can be used to increase the accuracy of the radial direction positioning. Furthermore, the use of three or more setting spacers 5 can make the respective parts 56, 57, 58 and 59 in the shape of a plate applicable to common use. That makes it possible to simplify the shape of the setting spacer and reduce the production costs substantially through mass production.

The mechanical seal M1 is thus assembled with the two seal units 3, 4 coupled with each other in a state properly positioned in the axial direction and radial direction by engaging connection means 37 and the setting spacers 5. This mechanical seal M1 can be installed, as it is, on rotary equipment and, then, put to a state ready for operation simply by removing the setting spacers 5.

The installation procedure is this. The sleeve 34 is mounted on the rotary shaft 2, and the mounting case 6 is secured to the shaft seal casing 1 by bolts and nuts 14 to hold the rotary seal unit 4 in the shaft seal casing 1. Then, the set screws 38a and second set screws 38b are screwed into the sleeve 34 and the rotary shaft 2 to fix the rotary seal unit 4 to the rotary shaft 2. Then, the setting spacers 5 are removed from the stopper ring 36 to complete installation of the mechanical seal M1 on rotary equipment (FIG. 1, FIG. 2).

The installation of the mechanical seal M1 on rotary equipment is quite easy and simple unlike the prior art of mounting component parts one by one because the mechanical seal M1 is an assembly in a ready-to-use state. Even an unskilled mechanic can do the job without trouble.

The mechanical seal M1 thus installed can seal and separate the fluid region A from the atmospheric region B by relative rotation and sliding of the seal end faces 25, 46. That is because as the rotary shaft 2 turns, the seal end face 25 of the stationary seal ring 7 or the seal ring element 22 and the opposed seal end face 46 of the rotary seal ring 35 are put in contact with each other under proper pressure and relatively rotate in a parallel and concentric state. Furthermore, a good seal function is achieved because the communicating section between the inner circumferential side of the seal end faces 25, 46 in the mounting case 6 and the atmospheric region B outside the mounting case 6 is subjected to secondary sealing by the annular seal member 18. The annular seal member 18 is stuffed in the inner circumferential recession 17 of the spring holder 10.

In the prior art mechanical seal, meanwhile, the stationary seal ring 7 is generally kept from relative rotation by pin members corresponding to the drive pins 24. The pin members are implanted in a component part equivalent to the spring receptor 8 and extend in the backward direction. Those pin members are inserted through holes formed in a component part corresponding to the spring holder 10. At an end portion, the pin members are provided with a stopper portion that is larger than the through hole in diameter. In this arrangement, however, the spring members which urge the stationary seal ring and the pin members which keep the stationary seal ring from relatively rotating can not be located away, by more than a specific distance, from the axis of rotation so as to avoid size increase of the mechanical seal. For this reason, a space equivalent to the annular recession 17 can not be secured in the inner circumferential portion of a member corresponding to the spring holder 10. That is, it is impossible to provide a secondary seal means like the annular seal member 18.

In the mechanical seal M1, on the other hand, the spring receptor 8 is formed of an annular plate with a cut-off 30 at one point. And the drive pin 24 is provided in the cylindrical case block 13 and is engaged with the stationary seal ring 7. That is why a space or the annular recession 17 for the annular seal member 18 can be secured without increasing the size of the mechanical seal M1 so much. And a secondary sealing by the annular seal members 18 can further enhance the seal function of the mechanical seal M1. Furthermore, the spring receptor 8 is made from an annular thin metal plate and is engaged with the outer circumferential portion of the stationary seal ring 7. That helps reduce the size of the mechanical seal M1 and the number of component parts, which in turn simplifies the construction and makes it easy to assemble those parts.

The mechanical seal M1 can be removed from rotary equipment also without difficulty by reversing the installation procedure. That is, the setting spacers 5 are first placed in the stopper ring 36 in such a way as described. Then, the set screws 38a and second set screws 38b are loosened and the mounting case 6 is removed from the shaft seal casing 1. In this manner, the mechanical seal M1 can be removed from rotary equipment in the same state as the one having been assembled and installed. That saves much labor for maintenance including assembling and overhauling.

Since the mechanical seal M1 according to the present invention can be installed on and removed from rotary equipment in the state of a cartridge structure in the same form as the form for actual operation, it can be used on the shaft sealing parts without modifications which are not designed for installation of a mechanical seal (such parts as stuffing box made for gland packing). Existing shaft sealing parts such as stuffing box can be adapted for a mechanical seal with ease.

(Embodiment 2)

A second embodiment will now be described with reference to FIGS. 12 to 15.

The mechanical seal M2 shown in FIGS. 12 to 15 is a cartridge-type mechanical seal to be installed between the shaft seal casing 1 of rotary equipment and the rotary shaft 2 that extends through and out of rotary equipment. The mechanical seal M2 is to seal the fluid region A or the inside region of rotary equipment from the atmospheric region B or the outside region. The cartridge-type mechanical seal M2 comprises a stationary seal unit 3, a rotary seal unit 4 and a plurality of setting spacers 5 that keep the two seal units 3, 4 coupled and locked while the seal M2 is not installed. It should be understood that, as used herein, the words front, before or forward denote left while such terms as rear, behind, back and backward indicate right in FIG. 12.

Figure 12:
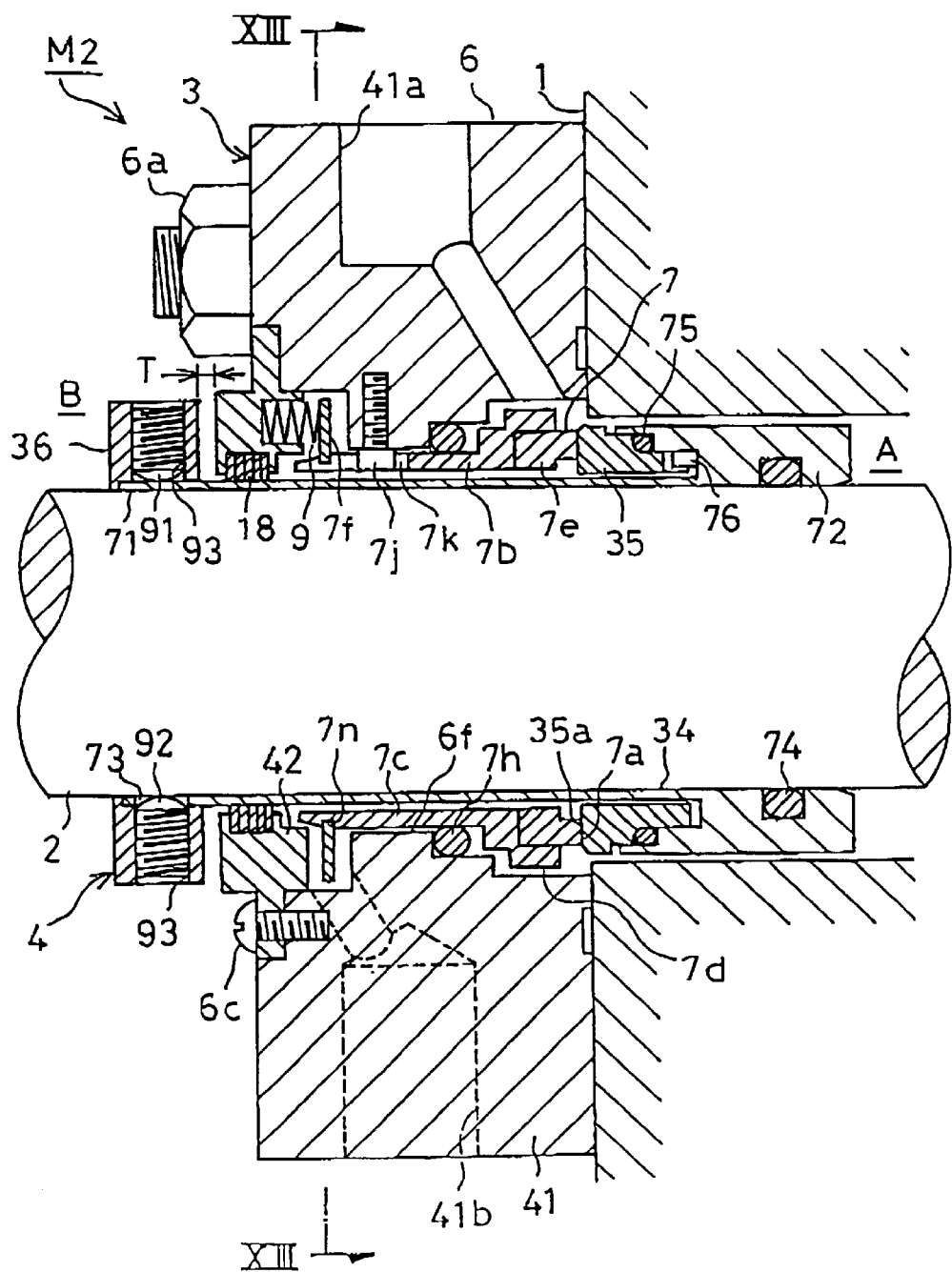
FIG. 12 is a side longitudinal sectional view of a second embodiment of the mechanical seal of the present invention showing the working arrangement for a sealing function.
Figure 14:
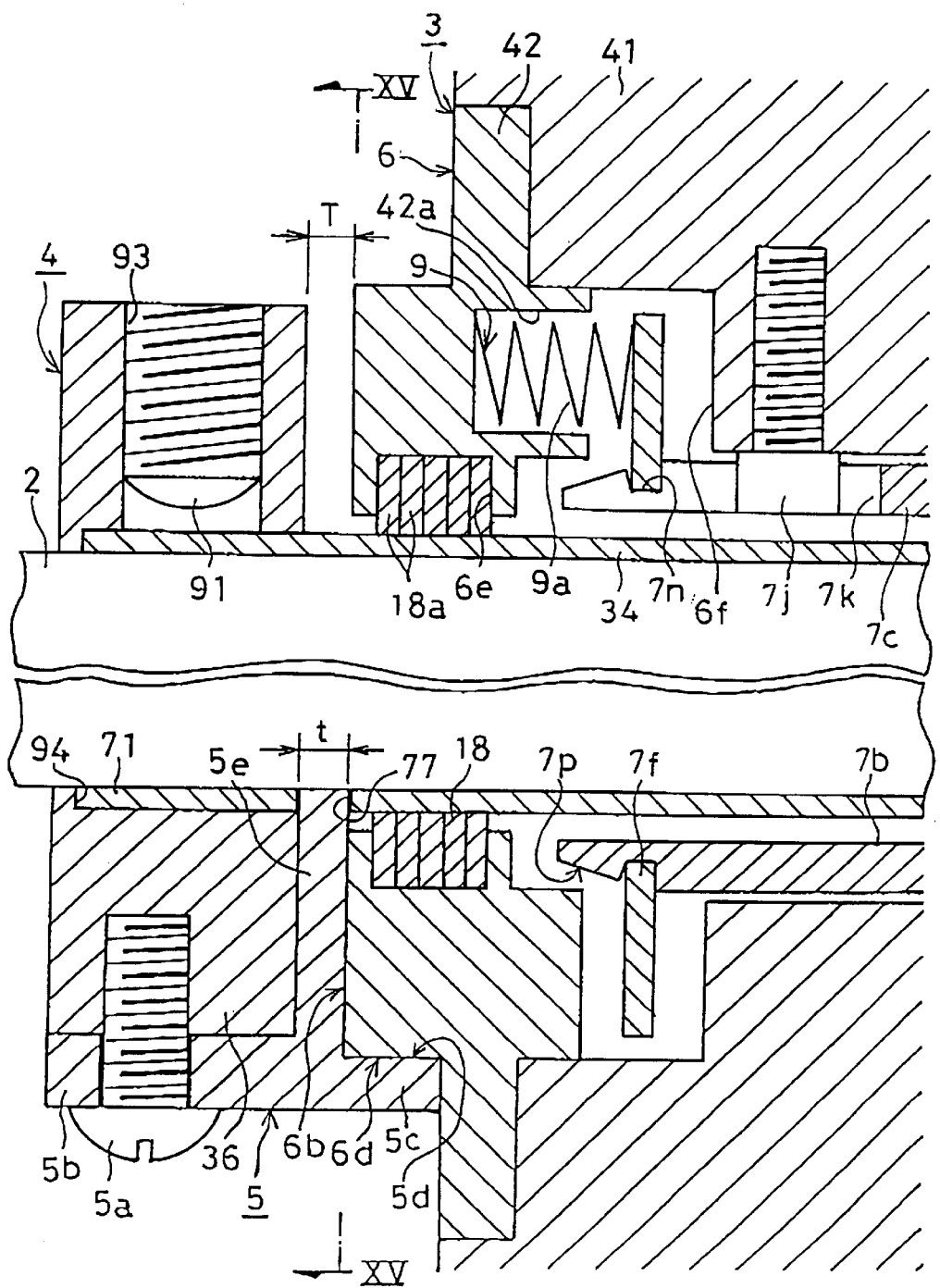
FIG. 14 is a side longitudinal sectional view (taken on line XIV□XIV in FIG. 15) of the core part of the mechanical seal being assembled.

The stationary seal unit 3 comprises a cylindrical mounting case 6 to be clamped on the shaft seal casing 1, a stationary seal ring 7 provided within the mounting case 6, a spring receptor 7f mounted on the stationary seal ring 7, spring members 9 provided between the mounting case 6 and the stationary seal ring 7, and a circular positioning surface 6d formed in the front end portion of the mounting case 6 concentrically with the stationary seal ring 7 as shown in FIG. 12 and FIG. 14. is The front end portion of the mounting case 6 is the front end portion of a spring holder 42 which will be described below.

The mounting case 6 includes a cylindrical case block 41 and the spring holder 42 fit and fixed in the inner circumferential portion at the front end of the cylindrical case block 41. The cylindrical case block 41 is mounted at the front end of the shaft seal casing 1 by means of bolts and nuts 6a (only one set shown) in such a state that the rotary shaft 2 is concentrically inserted in the cylindrical case block 41 as shown in FIG. 12 and FIG. 14. The spring holder 42 is mounted at the front end portion of the cylindrical case block 41 by means of a proper number of screws 6c (only one screw shown), with the front end 6b of the spring holder 42 protruded out of the front end face of the cylindrical case block 41 and with the rotary shaft 2 concentrically inserted therein. The front end face is formed in the shape of an annular plane perpendicular to the axis. The front end portion of the mounting case 6 or the outer circumferential surface of the spring holder 42 is formed into the circular positioning surface 6d concentric with the cylindrical case block 41 and the stationary seal ring 7 which will be described below. The annular recession 6e formed in the inner circumferential portion of the spring holder 42 is loaded with annular seal members 18 to work as secondary seal between the spring holder 42 and the rotary shaft 2 as shown in FIG. 14. In this example, the annular seal members 18 are a plurality of spiral rings made of PTFE (strips in a spiral form) 18a. Those spiral rings 18a put together in the axial direction are placed in the annular recession 6e. The cylindrical case block 41 is provided with a flushing passage 41a and a quenching passage 41b as shown in FIG. 12.

The stationary seal ring 7 comprises a cylindrical holder 7b and a seal ring element 7e attached thereto and is held in the inner circumferential portion of the cylindrical case block 41 movable in the axial direction and relatively unrotatable as shown in FIG. 12.

The cylindrical holder 7b comprises a thin wall first cylindrical portion 7c and thick second cylindrical portion 7d integrally formed at the rear end thereof as shown in FIG. 12. The first cylindrical portion 7c is provided with notched grooves 7k that extend in the axial direction and open forward as shown in FIG. 14. The seal ring element 7e is fit and fixed concentrically on the second cylindrical portion 7d.

Figure 13:
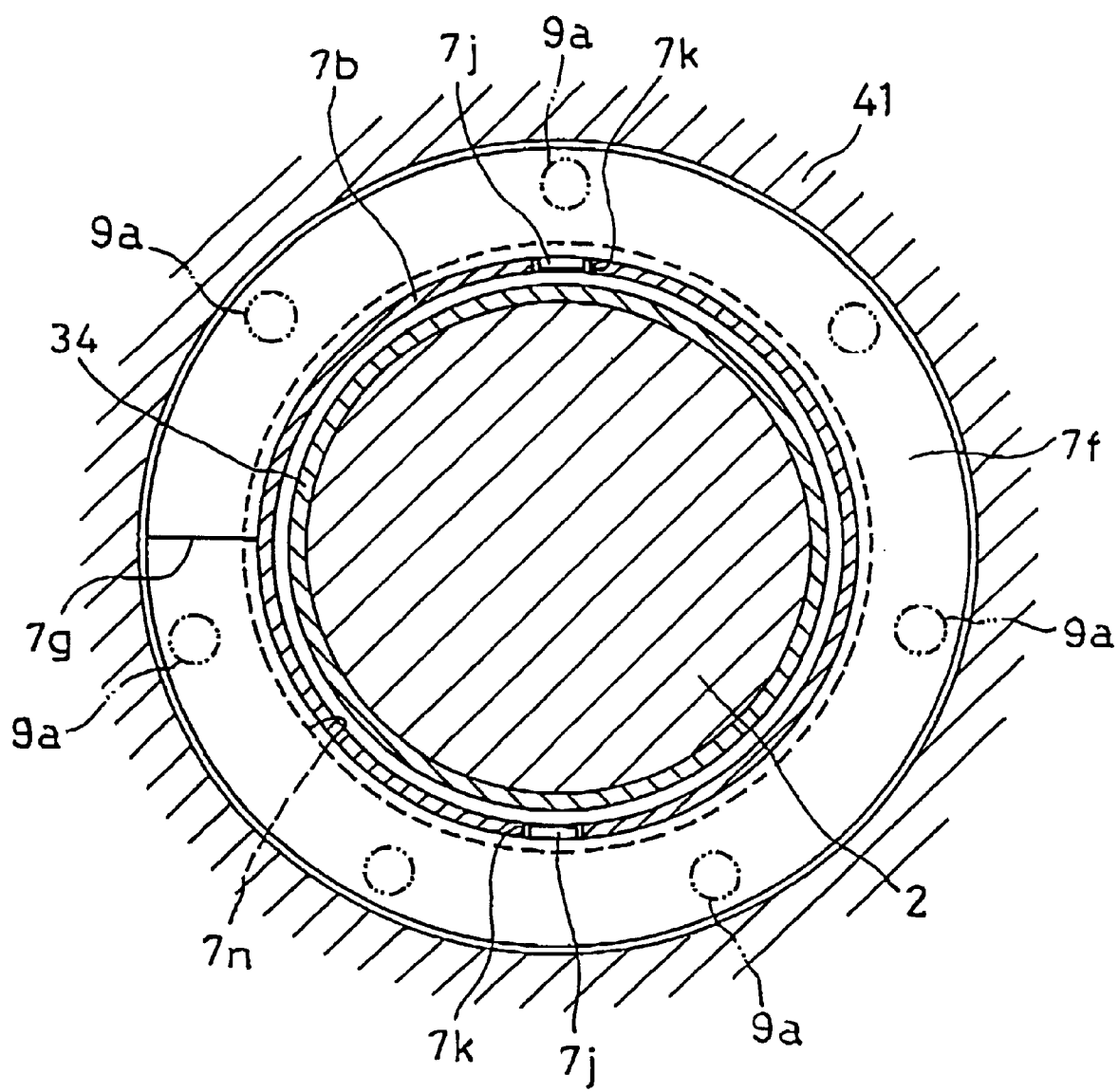
FIG. 13 is a front longitudinal sectional view taken on line XIII□XIII in FIG. 12.

The stationary seal ring 7 is held in the cylindrical case block 41 movable within the limit of the notched groove 7k in the axial direction and relatively unrotatable. The seal ring 7 is put in position by engaging drive pins 7j planted on the inner circumferential portion of the cylindrical case block 41 with the notched groove 7k formed in the first cylindrical portion 7c of the cylindrical holder 7b. The drive pins 7j are planted on the small-diameter annular shoulder 6f formed in the inner circumferential portion of the cylindrical case block 41. The inside diameter of the annular shoulder 6f is so chosen that the first cylindrical portion 7c of the cylindrical holder 7b can be passed through the annular shoulder 6f with some leeway. In this example, the drive pin 7j and notched groove 7k are provided at two places as shown in FIG. 13.

Furthermore, the stationary seal ring 7 is placed concentrically with the cylindrical case block 41 and held movable in the axial direction with a secondary seal. The secondary seal is provided by an O ring 7h placed between the outer circumferential portion of the first cylindrical portion 7c of the cylindrical holder 7b and the inner circumferential portion of the cylindrical case block 41 behind the annular shoulder 6f as shown in FIG. 12. This stationary seal ring 7 is concentric with the circular positioning surface 6d formed in the cylindrical case block 41. The spring receptor 7f is an annular plate with a cut-off 7g and is placed and fixed in an annular recession 7n formed on the outer circumferential portion in the front end portion of the first cylindrical portion 7c of the cylindrical holder 7b as shown in FIG. 12 to FIG. 14. The cut-off 7g permits the spring receptor 7f to be placed in or removed from the annular recession 7n using the material elasticity. The material and thickness are selected properly so that the spring receptor 7f is elastic and deformable enough to be placed in or removed from the annular recession 7n and strong enough to withstand the pressure of the spring members 9. In this example, the spring receptor 7f is an annular thin thickness plate made of the stainless steel SUS 316 with a cut-off 7g. The outer circumferential surface of the first cylindrical portion 7c of the cylindrical holder 7b is a tapered surface 7p with the diameter gradually decreasing from the annular recession 7n forward as shown in FIG. 14. That facilitates the mounting on or removal from the annular recession 7n of the spring receptor 7f. The spring receptor 7f is prevented from moving backward beyond a specific point by the front end portion of the annular shoulder 6f. That precludes the possibility of the stationary seal ring 7 moving back out of the mounting case 6 when thrust by the spring members 9 which will be described below.

The spring members 9 include a plurality of coil springs 9a placed between is the spring holder 42 and the spring receptor 7f to thrust the stationary seal ring 7 backward as shown in FIG. 12 and FIG. 14. The coil springs 9a are positioned at equal intervals in the circumferential direction as shown in FIG. 13. The front ends of the coil springs 9a are put and held in recessions 42a formed in the rear end portion of the spring holder 42.

The rotary seal unit 4 includes a sleeve 34 pulled over the rotary shaft 2, a rotary seal ring 35 clamped on the sleeve 34, a stopper ring 36 and a plurality of set screws 91, 92 as shown in FIG. 12.

The sleeve 34 is placed over the rotary shaft 2 with its front end portion 71 and rear end portion 72 protruding as shown in FIG. 12. The sleeve 34 is cylindrical with a thin wall thickness except for the rear end portion 72. The front end portion 71 is provided with a plurality of setting holes 73 (in this example, two setting holes 73). The rear end portion 72 of the sleeve 34 has an O ring 74 placed in its inner circumferential portion as secondary seal with the rotary shaft 2.

The rotary seal ring 35 is concentrically fit and clamped on the rear end portion 72 of the sleeve 34 via the an O ring 75 and drive pins 76 as shown in FIG. 12. The stationary seal ring 7 or the seal ring element 7e is thrust and brought into contact with the stationary seal ring 7 by the coil springs 9a. The opposed faces of the stationary seal ring 7 and the rotary seal ring 35 are ring-formed smooth seal end faces 7a and 35a with the opposed faces perpendicular to the axis.

Figure 15:
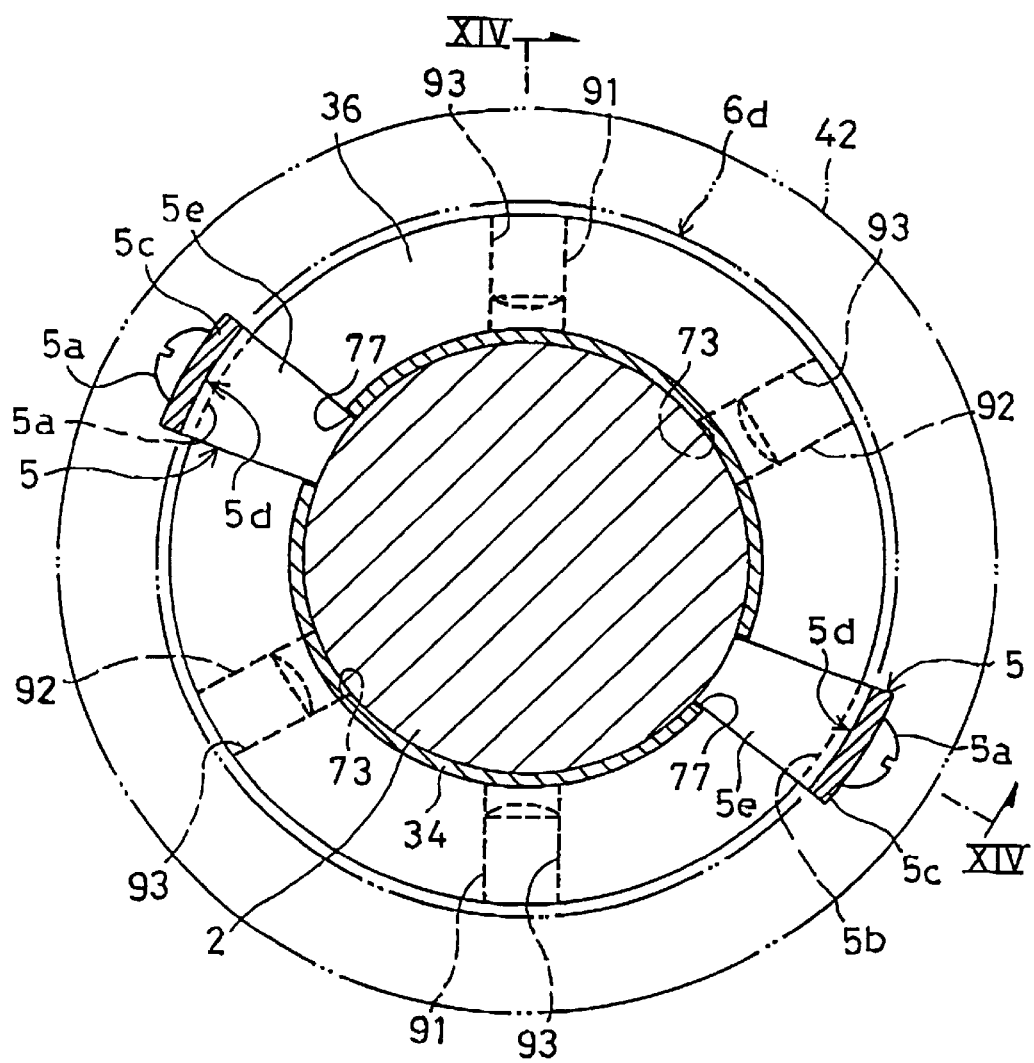
FIG. 15 is a rear longitudinal sectional view taken on line XV□XV in FIG. 14.

The stopper ring 36 is an annular component part concentrically fit around the front end portion 71 of the sleeve 34 as shown in FIGS. 12 and 14. The proper fitting state of the stopper ring 36 on the sleeve 34 can be secured by the annular shoulder 94 formed in the inner circumferential portion at the front end of the stopper ring 36 pressed against the front end face of the sleeve 34. The rear end face of the stopper ring 36 is an annular plane orthogonal to the axis of the sleeve 34 when the ring 36 is in the proper fitting state. The stopper ring 36 is provided with a plurality of screw holes 93 (in this example, 4 screw holes) at appropriate intervals in the circumferential direction. Those screw holes 93 are through holes formed in the radial direction. Of those screw holes 93, two holes come just above the setting holes 73 formed in the sleeve 34. The first set screws 91 are screwed into the other screw holes 93 that do not tally with the setting holes 73. As shown in FIG. 12, the stopper ring 36 can be clamped on the sleeve 34 by tightening up the first set screws 91 on the outer circumferential surface of the sleeve 34. On the other hand, second set screws 92 are screwed into the screw holes 93 that tally with the setting holes 73. The stopper ring 36 can be clamped on the rotary shaft 2 by tightening the second set screws 92 on the outer circumferential surface of the rotary shaft 2 through the setting holes 73 as shown in FIG. 12. In other words, the sleeve 34 can be clamped on the rotary shaft 2 by tightening the first set screws 91 and second set screws 92 in the stopper ring 36 (FIG. 12). And the sleeve 34 can be released from the rotary shaft 2 by loosening the first set screws 91 and second set screws 92 in the stopper ring 36 (FIG. 14 and FIG. 15). The whole length of the sleeve 34 is so set that the rear end face of the stopper ring 36 mounted on the sleeve 34 is a specific distance proper interval away from the front end face of the spring holder 42 in the axial direction when the two seal units 3, 4 are in a proper positional relation, that is, when the two seal rings 7 and 35 are brought in proper contact by the spring members 9.

The setting spacer 5 comprises, as shown in FIGS. 14 and 15, a mounting portion 5b in the shape of a circular arc plate which is clamped on the outer circumferential portion of the stopper ring 36 by screws 5a, a radial direction positioning portion 5c in the shape of a circular arc plate which is engaged with a circular positioning surface 6d formed in the mounting case 6 and an axial direction positioning portion 5e in the shape of a sectorial plate which is inserted between the front end 6b of the spring holder 42 and the stopper ring 36 and pressed into an engaging hole 77. The number of setting spacers 5 to be used is not restrictive. In this example, a pair of setting spacers 5 are mounted at points opposed to each other in the radial direction of the stopper ring 36 as shown in FIG. 15. The inside surface 5d of the radial direction positioning portion 5cwhich engages with the positioning surface 6d is a circular arc surface which has the same radius as the positioning surface 6d and which is concentric with the stopper ring 36 when the mounting portion 5b is mounted on the stopper ring 36. Therefore, if the mounting portion 5b is mounted on the stopper ring 36 with the inside surface 5d of the radial direction positioning portion 5c brought in close contact with the positioning surface 6d, the stopper ring 36 and the spring holder 42 are put into a concentric position without radial deviation. That puts the stationary seal unit 3 and the rotary seal unit 4 in a proper (concentric) positional relation in the radial direction. The stationary seal unit 3 includes the spring holder 42 and the cylindrical case block 41 that is concentric with the holder 42. The rotary seal unit 4 includes the stopper ring 36 and the sleeve 34 held concentrically therein. The axial direction positioning portion 5e is orthogonal to the mounting portion 5b so that when the mounting portion 5b is placed on the stopper ring 36, the positioning portion 5e comes in contact with the rear face of the stopper ring 36. And the plate thickness t in the front-to-back direction is so set as to be identical with the proper interval T The positions of the engaging holes 77 in the sleeve 34 are so chosen to receive and engage with the tip of the axial direction positioning portion 5e of the setting spacer 5 mounted on the stopper ring 36 when the stopper ring 36 in the proper fitting state with the sleeve 34 is a proper interval T away from the spring holder 42 in the axial direction. Therefore, even when the first set screws 91 and second set screws 92 are left loosened, that is, when the stopper ring 36 is not clamped on the sleeve 34 and in addition the sleeve 34 is not fixed on the rotary shaft 2, the axial direction positioning portion 5e is pressed between the stopper ring 36 and the spring holder 42, and the stopper ring 36 is kept from leaving the sleeve 34 by the axial direction positioning portion 5e engaging with the engaging hole 77 and thus held in a proper fitting state if the mounting portion 5b is mounted on the stopper ring 36 with the axial direction positioning portion 5e engaged with the stationary seal ring 7. That couples the two seal units 3, 4 relatively unmovable in the axial direction with the proper interval T maintained. For the sleeve is thrust forward in relation to the mounting case 6 by the coil springs 9a that keep the seal rings 7, 35 pressed against each other. The coupling and positioning of the two seal units 3, 4 require at least a pair of setting spacers 5.

The mechanical seal M2 thus arranged can be assembled into a cartridge construction which works the same way as the usual mechanical seal. The assembling procedure is as follows.

First, the stationary seal ring 7 with the O ring 7h fit over it is inserted into the case block 41 from behind. With the drive pins 7j engaged with the notched grooves 7k of the stationary seal ring 7, the spring receptor 7f is put and fixed in the annular recession 7n of the stationary seal ring 7. The spring receptor 7f can be placed in the annular recession 7n without difficulty because of a cutoff 7g in the annular plate that permits the spring receptor 7f to elastically deform. Furthermore, the tapered surface 7p on the outer circumferential surface in the front end portion of the stationary seal ring 7 makes the placement of the receptor 7f easier.

In the next step, the sleeve 34 with rotary seal ring 35 fixed on it is inserted into the stationary seal ring 7 from behind so that the stationary seal ring 7 is faced with the rotary seal ring 35. Then, the spring holder 42 with the coil springs 9a put in place is paced over the front end portion of the sleeve 34 protruding forward from the cylindrical case block 41. And the stopper ring 36 is fit over.

Then, the spring holder 42 is mounted on the cylindrical case block 41 by means of machine screws 6c to assemble the mounting case 6. And the mounting portions 5b of the setting spacers 5 are fixed on the stopper ring 36, with the radial direction positioning portion 5c engaged with the positioning surfaces 6d of the spring holder 42, the axial direction positioning portion 5e sandwiched between the stopper ring 36 and the spring holder 42 and put in the engaging hole 77 of the sleeve 34. That way, a mechanical seal M2 of the cartridge construction is assembled which has the two seal units 3, 4 put in the same positional relation as the mechanical seal in service (FIG. 14, FIG. 15).

It is noted that the axial direction positioning portion 5e of each setting spacer 5 mounted on the stopper ring 36 is engaged with the engaging hole 77 of the sleeve 34. Even if the set screws 91, 92 of the stopper ring 36 are left loose, there is no possibility that the stopper ring 36 will be thrown out of the sleeve 34 by the thrusting force of the coil springs 9a. In other words, the stopper ring 36 is held on the sleeve 34 in the proper fitting state, with the second set screws 92 tallying with the setting holes 73 of the sleeve 34 in the axial direction. The space in the axial direction between the stopper ring 36 and the spring holder 42 is held at the plate thickness t, that is, the proper interval T, because the axial direction positioning portions 5e of the respective setting spacers 5 are placed therebetween. In other words, the thrusting force of the coil springs 9a and engagement with the engaging holes 77 of axial direction positioning portions 5e of the setting spacers 5 couple and lock the stationary seal unit 3 and rotary seal unit 4 relatively in a proper positional relation in the axial direction. The proper positional relation means that the two seal units 3, 4 are brought into contact with each other under proper pressure.

To replace the mechanical seal M2, the stopper ring 36 has to be fixed on the sleeve 34 to have the two seal units 3, 4 coupled. The fixing of the stopper ring 36 on the sleeve 34 could be effected by tightening the set screws, especially the first set screws 91. But if the first set screws 91 are tightened up with the sleeve 34 not placed over the rotary shaft 2, the thin wall sleeve 34 can be deformed. One way to avoid such a problem might be to have a thicker wall thickness sleeve 34. But that makes it necessary to increase more than necessary the diameter of the stationary seal ring 7 through which the sleeve 34 is inserted and the rotary seal ring 35 which is fit and fixed on the sleeve 34. That in turn inevitably leads to enlargement of the case block 41 and other component parts, that is, the size of the mechanical seal M2 itself. In addition, since the sleeve 34 is a long component part, an increased wall thickness would enlarge the seal rings 7, 35 and other parts and increase the weight of the mechanical seal M2.

But if the axial direction positioning portion 5e of each setting spacer 5 is engaged with the engaging hole 77 as mentioned above, the stopper ring 36 can be fixed on the sleeve 34 without the set screws 91, 92 tightened. That makes it possible to reduce the thickness of the sleeve 34 and the size and weight of the mechanical seal M2 to the maximum extent without having such aforesaid problems. The positional relation between the stopper ring 36 and the spring holder 42 in relation to the radial direction is concentric, because the radial direction positioning portions 5c of the two setting spacers 5 mounted on the stopper ring 36 that are opposed to each other in the radial direction engage with the positioning surface 6d of the spring holder 42. Therefore, the two seal units 3, 4 are coupled and locked such that the relative positional relation in relation to the radial direction is proper. As a result, the stationary seal ring 7 held in the mounting case 6 concentrically with the positioning surface 6d is held concentrically in the positional relation in relation to the radial direction with the rotary seal ring 35 fit and fixed concentrically over the sleeve 34. That secures the parallelism and concentricity of the opposed seal ring faces 7a, 35a of the two seal ring 7, 35.

Thus, the mechanical seal M2 has the two seal units 3, 4 coupled and locked by a pair of setting spacers 5 in such a state that the two seal units 3, 4 are positioned properly in the axial direction and radial direction. The mechanical seal M2 thus assembled can be installed directly on rotary equipment. If the setting spacers 5 are removed, the mechanical seal M2 is ready to work and function well.

The installation procedure is this. The sleeve 34 is placed over the rotary shaft 2. The mounting case 6 is clamped on the shaft seal casing 1 by means of bolts and nuts 6a to mount the rotary seal unit 4 on the shaft seal casing 1. And the first set screws 91 are screwed into the sleeve 34 to fix the stopper ring 36 on the sleeve 34. The second set screws 92 are tightened on the rotary shaft 2 through the setting holes 73. And the setting spacers 5 are removed from the stopper ring 36. That completes installation of the mechanical seal M2 on rotary equipment (FIG. 12). The installation of the mechanical seal M2 on rotary equipment is quite easy and simple unlike the prior art of mounting component parts one by one because the mechanical seal M2 is an assembly in a ready-to-use state. Even an unskilled mechanic can do the job without trouble.

The mechanical seal M2 thus installed can seal the fluid region A from the atmospheric region B through relatively rotating and sliding action on the seal end faces 7a, 35a. That is because as the rotary shaft 2 turns, the seal end face 7a of the stationary seal ring 7 or the seal ring element 35 and the opposite seal end face 35a of the rotary seal ring 35 are put in contact with each other under proper pressure and relatively rotate in a parallel and concentric state. Furthermore, a good seal function is achieved because the communicating section between the inner circumferential portion of the seal end faces 7a, 35a in the mounting case 6 and the 15 atmospheric region B outside the mounting case 6 is given secondary seal by the annular seal member 18 stuffed in the inner circumferential recession 6e of the spring holder 42.

In the prior art mechanical seal, meanwhile, the stationary seal ring 7 is generally kept from relatively rotating by pin members corresponding to the drive pins 7j. The pin members are planted on the front end of a component part equivalent to the spring receptor 42. Those pin members are inserted into through holes formed in a component part corresponding to the spring holder 42. At their front end portion, the pin members are provided with a stopper portion that is larger than the through hole in diameter. In this arrangement, however, the pin members that keep the spring members to thrust the stationary seal ring and the stationary seal ring from relatively rotating can not be located beyond a specific distance from the axis of rotation so as to avoid size increase of the mechanical seal. For this reason, a space equivalent to the annular recession 6e can not be secured on the inner circumferential portion corresponding to the spring holder 42, and therefore it is impossible to provide secondary seal means like the annular seal member 18. In the mechanical seal M2, on the other hand, the spring receptor 7f is an annular plate with a cut-off 7g at one point. And the drive pin 7j is provided in the cylindrical case block 41 and is engaged with the stationary seal ring 7. That is why a space or the annular recession 17 for the annular seal member 18 is secured without increasing the size of the mechanical seal M2 so much. And a secondary seal by the annular seal members 18 can further enhance the seal function of the mechanical seal M2. Furthermore, the spring receptor 7f is made from an annular thin metal plate and is engaged with the outer circumferential portion of the stationary seal ring 7. That helps reduce the size of the mechanical seal M2 and the number of component parts, which in turn simplifies the construction and makes it easy to assemble those parts.

The mechanical seal M2 can be removed from rotary equipment also without difficulty by reversing the installation procedure. That is, the setting spacers 5 are first placed in the stopper ring 36 in such a way as described. Then, the set screws 91, 92 are loosened and the mounting case 6 is removed from the shaft seal casing 1. And the mechanical seal M2 as assembled unit ready for use can be removed from rotary equipment. That saves much labor for maintenance including assembling and overhauling.

Since the mechanical seal M2 according to the present invention can be installed on and removed from rotary equipment as assembled cartridge structure, it can be used on the shaft sealing parts without modifications which are not designed for installation of a mechanical seal such parts as stuffing box made for gland packing. Existing shaft sealing parts such as stuffing box can be adapted for a mechanical seal with ease.

What is claimed is:

1. A cartridge-type mechanical seal comprising a stationary seal unit to be mounted on the shaft seal casing and a rotary seal unit to be mounted around the rotary shaft extending through the shaft seal casing, and a plurality of removable setting spacers wherein said stationary seal unit and said rotary seal unit are coupled and held by said setting spacers in such a way that the positional relation between the two units in the axial and radial directions is the same as when said mechanical seal is in service and wherein said setting spacers are removed once said two units are mounted on the shaft seal casing and the rotary shaft wherein said stationary seal unit comprises a cylindrical mounting case to be mounted on the shaft seal casing, a stationary seal ring held in the mounting case and a circular positioning surface formed in the mounting case concentrically with the stationary seal ring, and wherein said rotary seal unit comprises a sleeve in the form of a thin wall cylinder to be mounted removably around the rotary shaft and to be inserted concentrically into the stationary seal unit with one end portion of said sleeve protruding out of the mounting case, a rotary seal ring mounted on the other end portion of the sleeve opposite to the stationary seal ring, a stopper ring mounted around the one end portion of the sleeve and engaging connection means to connect the stopper ring and the sleeve for preventing their relative movement in the axial direction, wherein said engaging connection means include an annular groove formed in the inner circumferential portion of the stopper ring, a plurality of pin engaging holes formed in the sleeve, a plurality of headed pins comprising a pin portion to engage with the pin engaging hole and a head portion which engages with said annular groove such that the head portion is relatively movable in the annular groove of the stopper ring in the circumferential direction of said ring, but is relatively unmovable in the axial direction, and a plurality of head lead-in inlets that open said annular groove on one side of the stopper ring at a plurality of points in the circumferential direction and lead in said annular groove the heads of the headed pins engaged with the respective pin engaging holes by relatively moving said heads in the axial direction.

2. The cartridge-type mechanical seal as defined in claim 1 wherein each setting spacer has a mounting portion that can be fixed on or removed from the stopper ring and an engaging portion that engages with said positioning surface.

3. The cartridge-type mechanical seal as defined in claim 2 or 1 that comprises a stationary seal ring held in the mounting case to be movable in the axial direction, a rotary seal ring fixed on the rotary shaft side opposite to one end portion of the stationary seal ring, and spring members to urge the stationary seal ring against the rotary seal ring, wherein the stationary seal ring is provided with an annular recession in the outer circumferential portion at the other end portion, wherein a spring receptor formed of an annular plate cut off at one point is placed and fixed in said recession using its material elasticity, wherein spring members are placed between the spring receptor and the mounting case opposed thereto, wherein the engaging grooves extending in the axial direction are formed in the other end portion of the stationary seal ring and drive pins fixed on the mounting case are engaged with said engaging grooves, and wherein the circumferential surface in the other end portion of the stationary seal ring is tapered with the diameter gradually reduced toward the forward end at a portion forward of said annular recession.

4. A cartridge-type mechanical seal comprising a stationary seal unit to be mounted on the shaft seal casing and a rotary seal unit to be mounted around the rotary shaft extending through the shaft seal casing, and a plurality of removable setting spacers wherein said stationary seal unit and said rotary seal unit are coupled and held by said setting spacers in such a way that the positional relation between the two units in the axial and radial directions is the same as when said mechanical seal is in service and wherein said setting spacers are removed once said two units are mounted on the shaft seal casing and the rotary shaft wherein said stationary seal unit comprises a cylindrical mounting case to be mounted on the shaft seal casing, a stationary seal ring held in the mounting case and a circular positioning surface formed in the mounting case concentrically with the stationary seal ring, and wherein said rotary seal unit includes a sleeve in the form of a thin wall cylinder to be mounted removable around the rotary shaft and to be inserted concentrically into the stationary seal unit with one end portion of said sleeve protruding out of the mounting case, a rotary seal ring mounted on the other end portion of the sleeve opposite to the stationary seal ring, a stopper ring mounted around the one end of the sleeve, first set screws that are screwed into the stopper ring and can be tightened against the outer circumferential surface of the sleeve, and second set screws that are screwed into the stopper ring and can be tightened against the outer circumferential surface of the rotary shaft around which the sleeve is mounted, and wherein the setting spacers have a mounting portion that can be fixed on or removed from the stopper ring, an axial direction positioning portion that is placed in and engaged with engaging holes formed in the sleeve and a radial direction positioning portion that is engaged with the positioning surface.

5. The cartridge-type mechanical seal as defined in claim 4 wherein one seal ring unit includes spring member to press and bring two seal rings into contact, wherein the axial direction positioning portion of each setting spacer is pressed between the opposed surfaces of the mounting case and the stopper ring by the thrusting force of the spring members when the two seal rings are properly pressed against and kept in contact with each other, and wherein sleeve engaging holes are formed where the axial direction positioning portion thus pressed is allowed to engage with the engaging hole.

6. The cartridge-type mechanical seal as defined in claim 5 that comprises a stationary seal ring held in the mounting case to be movable in the axial direction, a rotary seal ring fixed on the rotary shaft side opposite to one end portion of the stationary seal ring, and spring members to urge the stationary seal ring against the rotary seal ring, wherein the stationary seal ring is provided with an annular recession in the outer circumferential portion at the other end portion, wherein a spring receptor formed of an annular plate cut off at one point is placed and fixed in said recession using its material elasticity, wherein spring members are placed between the spring receptor and the mounting case opposed thereto, wherein the engaging grooves extending in the axial direction are formed in the other end portion of the stationary seal ring and drive pins fixed on the mounting case are engaged with said engaging grooves, and wherein the circumferential surface in the other end portion of the stationary seal ring is tapered with the diameter gradually reduced toward the forward end at a portion forward of said annular recession.

7. The cartridge-type mechanical seal as defined in claim 4 wherein the circumferential surface in the other end portion of the stationary seal ring is tapered with the diameter gradually reduced toward the forward end at a portion forward of said annular recession.

8. The cartridge-type mechanical seal as defined in claim 4 that comprises a stationary seal ring held in the mounting case to be movable in the axial direction, a rotary seal ring fixed on the rotary shaft side opposite to one end portion of the stationary seal ring, and spring members to urge the stationary seal ring against the rotary seal ring wherein the stationary seal ring is provided with an annular recession in the outer circumferential portion at the other end portion, wherein a spring receptor formed of an annular plate cut off at one point is placed and fixed in said recession using its material elasticity, wherein spring members are placed between the spring receptor and the mounting case opposed thereto, wherein the engaging grooves extending in the axial direction are formed in the other end portion of the stationary seal ring and drive pins fixed on the mounting case are engaged with said engaging grooves.

9. The cartridge-type mechanical seal as defined in claim 4 that comprises a stationary seal ring held in the mounting case to be movable in the axial direction, a rotary seal ring fixed on the rotary shaft side opposite to one end portion of the stationary seal ring, and spring members to urge the stationary seal ring against the rotary seal ring, wherein the stationary seal ring is provided with an annular recession in the outer circumferential portion at the other end portion, wherein a spring receptor formed of an annular plate cut off at one point is placed and fixed in said recession using its material elasticity, wherein spring members are placed between the spring receptor and the mounting case opposed thereto, wherein the engaging grooves extending in the axial direction are formed in the other end portion of the stationary seal ring and drive pins fixed on the mounting case are engaged with said engaging grooves, and wherein the circumferential surface in the other end portion of the stationary seal ring is tapered with the diameter gradually reduced toward the forward end at a portion forward of said annular recession.

10. A cartridge-type mechanical seal comprising a stationary seal unit to be mounted on the shaft seal casing and a rotary seal unit to be mounted around the rotary shaft extending through the shaft seal casing, and a plurality of removable setting spacers wherein said stationary seal unit and said rotary seal unit are coupled and held by said setting spacers in such a way that the positional relation between the two units in the axial and radial directions is the same as when said mechanical seal is in service and wherein said setting spacers are removed once said two units are mounted on the shaft seal casing and the rotary shaft, said cartridge-type mechanical seal further comprising a stationary seal ring held in the mounting case to be movable in the axial direction, a rotary seal ring fixed on the rotary shaft side opposite to one end portion of the stationary seal ring, and spring members to urge the stationary seal ring against the rotary seal ring. The stationary seal ring being provided with an annular recession in the outer circumferential portion at the other end portion, wherein a spring receptor formed of an annular plate cut off at one point is placed and fixed in said recession using its material elasticity, wherein spring members are placed between the spring receptor and the mounting case opposed thereto, wherein the engaging grooves extending in the axial direction are formed in the other end portion of the stationary seal ring and drive pins fixed on the mounting case are engaged with said engaging grooves, and wherein the circumferential surface in the other end portion of the stationary seal ring is tapered with the diameter gradually reduced toward the forward end at a portion forward of said annular recession.

* * * * *